US009537713B2

(12) United States Patent
Chu et al.

(10) Patent No.: US 9,537,713 B2
(45) Date of Patent: Jan. 3, 2017

(54) METHOD OF SETTING PN ON THE BASIS OF PERSONAL NETWORK USAGE INFORMATION IN HETEROGENEOUS NETWORK

(71) Applicant: LG Electronics Inc., Seoul (KR)

(72) Inventors: Younsung Chu, Anyang-si (KR); Seungmyeong Jeong, Anyang-si (KR)

(73) Assignee: LG Electronics Inc., Seoul (KR)

( * ) Notice: Subject to any disclaimer, the term of this patent is extended or adjusted under 35 U.S.C. 154(b) by 440 days.

(21) Appl. No.: 14/351,431

(22) PCT Filed: Nov. 5, 2012

(86) PCT No.: PCT/KR2012/009243
§ 371 (c)(1),
(2) Date: Apr. 11, 2014

(87) PCT Pub. No.: WO2013/066131
PCT Pub. Date: May 10, 2013

(65) Prior Publication Data
US 2015/0109956 A1  Apr. 23, 2015

Related U.S. Application Data

(60) Provisional application No. 61/702,223, filed on Sep. 17, 2012, provisional application No. 61/700,898, (Continued)

(51) Int. Cl.
*H04L 12/28* (2006.01)
*H04L 12/24* (2006.01)
(Continued)

(52) U.S. Cl.
CPC ............. *H04L 41/08* (2013.01); *H04L 12/12* (2013.01); *H04L 12/4641* (2013.01); *Y02B 60/34* (2013.01)

(58) Field of Classification Search
CPC ...... H04L 12/24; H04L 12/12; H04L 12/4641; H04L 41/08; Y02B 60/34
(Continued)

(56) References Cited

U.S. PATENT DOCUMENTS

| 2011/0090886 A1* | 4/2011 | Park | ...................... H04W 4/203 370/338 |
| 2011/0307620 A1* | 12/2011 | Park | ...................... H04L 12/2809 709/229 |
| 2012/0177056 A1* | 7/2012 | Park | ...................... H04L 12/2834 370/401 |

FOREIGN PATENT DOCUMENTS

| KR | 1020110041966 | 4/2011 |
| KR | 1020110041995 | 4/2011 |
| KR | 1020110042711 | 4/2011 |

* cited by examiner

*Primary Examiner* — Dang Ton
*Assistant Examiner* — Abdeltif Ajid
(74) *Attorney, Agent, or Firm* — Dentons US LLP

(57) ABSTRACT

The present invention relates to a method in which a personal network element (PNE) forming a PN requests a converged personal network service (CPNS) to set up a new personal network (PN) on the basis of PN usage information. The method is performed by the PNE and includes: transmitting, to a PN gateway (PN GW), a message requesting the generation of PN usage information on a currently set PN; and receiving a generation response message including the result of generating the PN usage information corresponding to the generation request message. The PN usage information is created by the CPNS server on the basis of the generation request message and is stored in a PN usage information list of the CPSN. The PN usage information includes a PN usage information index, a PN alias, an expiry, a PN identifier (ID), a PN GW ID, and a PNE ID. The method further includes: transmitting, to the PN GW, a message requesting the setting of a PN using PN usage (Continued)

information corresponding to a new PN, in order to set the new PN and not the currently set PN; and receiving, from the PN GW, a message responding to setting the PN including a response to the PN setting request message, wherein a PN inventory of the CPNS server may be updated by the CPNS on the basis of selected PN usage information.

28 Claims, 11 Drawing Sheets

Related U.S. Application Data filed on Sep. 14, 2012, provisional application No. 61/697,280, filed on Sep. 5, 2012, provisional application No. 61/670,117, filed on Jul. 10, 2012, provisional application No. 61/669,009, filed on Jul. 6, 2012, provisional application No. 61/555,461, filed on Nov. 3, 2011.

(51) Int. Cl.
*H04L 12/12* (2006.01)
*H04L 12/46* (2006.01)

(58) Field of Classification Search
USPC .......................................................... 370/254
See application file for complete search history.

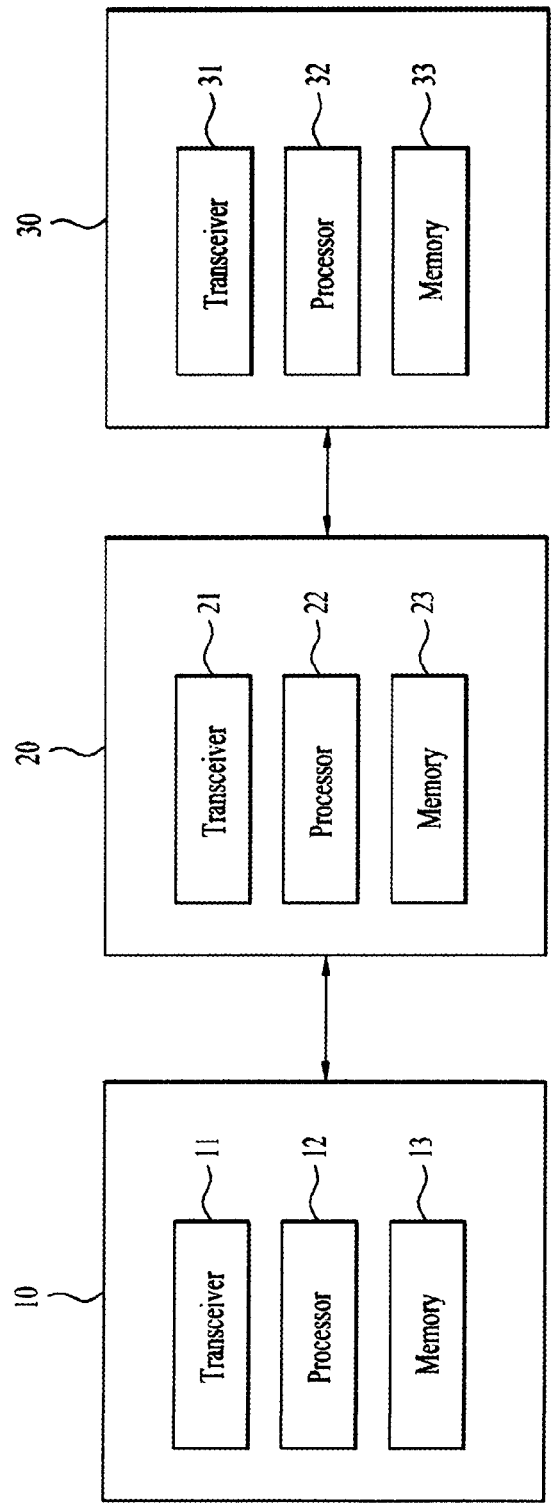

METHOD OF SETTING PN ON THE BASIS OF PERSONAL NETWORK USAGE INFORMATION IN HETEROGENEOUS NETWORK This application is a 35 USC §371 National Stage entry of International Application No. PCT/KR2012/009243 filed on Nov. 5, 2012, and claims priority to U.S. Provisional Application Nos. 61/702,223 filed on Sep. 17, 2012; 61/700,898 filed on Sep. 14, 2012; 61/697,280 filed on Sep. 5, 2012; 61/670,117 filed on Jul. 10, 2012; 61/669,009 filed on Jul. 6, 2012 and 61/555,461 filed on Nov. 3, 2011, all of which are hereby incorporated by reference in their entireties as if fully set forth herein.

TECHNICAL FIELD

The present invention relates to a Converged Personal Network Service (CPNS), and more particularly, to, if a Personal Network (PN) has been established for a CPNS, storing usage information related to the PN and establishing a PN using the stored PN usage information.

BACKGROUND ART

Among a variety of techniques, Digital Living Network Alliance (DLNA) or ZigBee focuses on service discovery and service use between devices within a specific Personal Area Network (PAN), whereas tethering focuses on connectivity between heterogeneous networks.

Unlike the simple PAN, the concept of CPNS has been introduced.

In the CPNS, devices can belong to a PN (or PAN) and receive various services.

The CPNS is implemented by a CPNS server, a CPNS GateWay (CPNS GW) (or a PN GateWay (PN GW)), and a CPNS device (or a PN Element (PNE)). Besides, a general server, general devices, etc. may exist for the CPNS.

The CPNS is provided based on a PN formed with a set of devices. A CPNS GW is deployed in the PN and services of the devices belonging to the PN are registered to the CPNS server through the CPNS GW. Thus a device that provides a specific service may be searched for in the CPNS server and an external device may share the specific service provided by the device based on the search.

The CPNS GW connects the PN to another network. A CPNS device is a member of the PN. One or more devices may form one PN.

FIG. 1 is an exemplary view illustrating the concept of the CPNS. A content server, a CPNS server, a PN GW, and PNEs are shown in FIG. 1.

The CPNS server may communicate with one or more PN GWs and may transmit data to or receive data from the PN GWs. The CPNS server may exchange data with one or more CPNS devices within PNs (or PANs) through the PN GWs by communication. Each of the PNEs may transmit data to or receive data from one or more other PNEs or general devices through a CPNS GW. A PN GW may transmit data to or receive data from the CPNS server, a PN GW belonging to another PN, or a PNE by communication.

The CPNS server may transmit data to or receive data from a general server and a PN GW by communication. For example, the CPNS server and the PN GW may communicate with each other through a cellular network and the PN GW and a PNE may communicate with each other by short-range communication such as Bluetooth, Near Field Communication (NFC), ZigBee, Wireless Fidelity (WiFi), etc.

The CPNS server may manage and control communication between a PN GW and a PNE. The resulting exchange of applications and information may increase user experience. For example, in FIG. 1, a user may acquire location information from another PNE (e.g., a Global Positioning System (GPS) receiver) through one of PNEs, for example, a PNE that does not have a location measurement function, may transmit the location information to the CPNS server through the PN GW, and may receive a location-based service from the CPNS server. In this manner, if there is a PNE having a function that another PNE does not have in the same PN, a user may receive various services through various PNEs of the PN by the CPNS.

The CPNS supports two models: a client-server model in which a server provides a service to a PNE under management of a CPNS server and a peer-to-peer model in which different PNs are combined.

In the client-server model that is basically considered, the coverage of a service provided to a mobile phone PN GW1 over a cellular network can be expanded to other devices PNE1 to PNE3 connected to PN GW1. The PNEs may receive various services provided by a content server (or an application server) through PN GW1.

There is a conventional PN setup method in which each time a PN is set up, a user should perform a procedure of connecting a PN GW to PNEs and establishing a PN from the beginning step by step in order to set up the PN. Or a desired PN may be set up only by inviting a desired additional entity other than entities (a PN GW and a PNE) of a current PN to the current PN or removing a corresponding entity from the current PN. That is, there is no function of returning to a previous PN setup state using previous PN information or searching for frequently used PN information.

DISCLOSURE

Technical Problem

An object of the present invention devised to solve the conventional problem is to provide a method for facilitating a user to set up a Personal Network (PN) using previous PN usage information and a method for creating PN usage information.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for requesting, by a Personal Network Element (PNE) being a member of a Personal Network (PN), setup of a new PN based on PN usage information to a Converged Personal Network Service (CPNS) server, the method includes transmitting, to a PN Gateway (PN GW), a request message for creating PN usage information on a PN being established currently (hereinafter, referred to as "current PN"), and receiving, from the PN GW, a response message including creation result of the PN usage information in response to the request message. The PN usage information may be created by the CPNS server, based on the request message and stored in a PN usage information list of the CPNS server, and the PN usage information includes a PN usage information index, a PN alias, an expiration time, a PN Identifier (ID), a PN GW ID, and a PNE ID. The method further may include transmitting, to the PN GW, a PN setup request message using selected PN usage information for the new PN other than the current PN to set up the new PN, and receiving, from the PN GW, a PN setup response message including a response to the PN setup request message. A PN inventory of the CPNS server may be updated by the CPNS server, based on the selected PN usage information.

Preferably, the request message may include a user ID, a PN alias, an expiration time, and an indicator indicating whether to store the PN usage information in the PN.

Preferably, if the PNE wants to delete PN usage information for the current PN, the expiration time of the request message may be set to 0.

Preferably, if the indicator indicates that the PN usage information is to be stored in the PNE and the PN GW, the response message may include the created PN usage information.

Preferably, if the indicator indicates that the PN usage information is to be stored in the PNE and the PN GW, the created PN usage information included in the response message may be stored in a PN usage information list of the PNE.

Preferably, the PN setup request message may include a PNE ID of at least one PNE that will belong to the new PN, except for the ID of the PNE, and the PNE ID may be updated by the PN GW to a PNE ID of a PNE available for PN setup among PNEs identified by the PNE ID.

Preferably, the method may further include, if there is no PN usage information list including PN usage information for the new PN in the PNE, transmitting, to the PN GW, a list request message for requesting a PN usage information list including the PN usage information for the new PN, and receiving, from the PN GW, a list response message including the PN usage information list including the PN usage information for the new PN, the list response message may be transmitted by the CPNS server.

Preferably, the list request message may include a user ID, maximum list length information indicating a maximum list length that the PNE can receive, and query option information related to the request.

Preferably, the PN setup request message may include a user ID, a PN usage information index, and a PNE ID.

Preferably, the method may further include, if the new PN is set up in response to the PN setup request, receiving a PN setup notification message from the PN GW.

In another aspect of the present invention, a method for processing, by a Converged Personal Network Service (CPNS) server, a request for setup of a new Personal Network (PN) based on PN usage information received from a PNE being a member of a PN includes receiving, from a PN Gateway (PN GW), a request message for creating a PN usage information on a PN being established currently (hereinafter, referred to as "current PN"), the request message may be generated by the PNE and generating and transmitting, to the PN GW, a response message including creation result of the PN usage information in response to the request message. The PN usage information may be created by the CPNS server, based on the request message and stored in a PN usage information list of the CPNS server, and the PN usage information includes a PN usage information index, a PN alias, an expiration time, a PN ID, a PN GW ID, and a PNE ID. The method further may include receiving, from the PN GW, a PN setup request message using selected PN usage information for the new PN other than the current PN to set up the new PN, updating a PN inventory based on the selected PN usage information, and transmitting, to the PN GW, a PN setup response message including a response to the PN setup request message.

Preferably, the request message may include a user ID, a PN alias, an expiration time, and an indicator indicating whether to store the PN usage information in the PN.

Preferably, if the indicator indicates that the PN usage information is to be stored in the PNE and the PN GW, the response message may include the created PN usage information.

Preferably, the method may further include, upon receipt of the request message, checking whether a PN usage information list matching to a user ID included in the request message exists in the PN usage information list.

Preferably, the method may further include, if no PN usage information list exists, creating a PN usage information list and PN usage information, and if the PN usage information list exists, copying information about the current PN from the PN inventory to the PN usage information list.

Preferably, the PN setup request message may include a PNE ID of a PNE that will belong to the new PN, except for the ID of the PNE, and the PNE ID may be updated by the PN GW to a PNE ID of a PNE available for PN setup among PNEs identified by the PNE ID.

Preferably, the method may further include, upon receipt of the PN setup request message, retrieving PN information based on PN usage information included in the PN setup request message from the PN usage information list.

Preferably, the method may further include if there is no PN usage information list including the PN usage information for the new PN in the PNE, receiving, from the PN GW, a list request message for requesting a PN usage information list including the PN usage information for the new PN, searching for PN usage information matching to a user ID included in the list request message, and transmitting, to the PN GW, a list response message including the PN usage information list including the PN usage information for the new PN.

Preferably, the list request message may include a user ID, maximum list length information indicating a maximum list length that the PNE can receive, and query option information related to the request.

In another aspect of the present invention, a method for requesting, by a Personal Network Gateway (PN GW) being a member of a Personal Network (PN), setup of a new PN based on PN usage information to a Converged Personal Network (CPNS) server includes transmitting, to the CPNS server, a request message for creating PN usage information for a PN being established currently (hereinafter, referred to as "current PN"), and receiving, from the CPNS server, a response message including creation result of the PN usage information in response to the request message. The PN usage information may be created by the CPNS server, based on the request message and stored in a PN usage information list of the CPNS server, and the PN usage information includes a PN usage information index, a PN alias, an expiration time, a PN Identifier ID, a PN GW ID, and a PNE (PN Entity) ID. The method further may include transmitting, to the CPNS server, a PN setup request message using selected PN usage information for the new PN other than the current PN to set up the new PN, receiving, from the CPNS server, a PN setup response message including a response to the PN setup request message, and storing PN information included in the PN setup response message in a PN inventory. A PN inventory of the CPNS server may be updated by the CPNS server, based on the selected PN usage information.

Preferably, the request message may include a user ID, a PN alias, an expiration time, and an indicator indicating whether to store the PN usage information in the PN.

Preferably, if the PN GW wants to delete PN usage information for the current PN, the expiration time of the PN setup request message may be set to 0.

Preferably, if the indicator indicates that the PN usage information is to be stored in a PNE and the PN GW, the response message may include the created PN usage information.

Preferably, if the indicator indicates that the PN usage information is to be stored in a PNE and the PN GW, the created PN usage information included in the response message may be stored in a PN usage information list of the PN GW.

Preferably, the method may further include, if the PN GW has no PN usage information list including PN usage information for the new PN, transmitting, to the CPNS server, a list request message for requesting a PN usage information list including the PN usage information for the new PN to the CPNS server, and receiving, from the CPNS server, a list response message including the PN usage information list including the PN usage information for the new PN.

Preferably, the list request message may include a user ID, maximum list length information indicating a maximum list length that a PNE can receive, and option information related to the request.

Preferably, the PN setup request message may include a user ID, a PN usage information index, and a PNE ID.

Preferably, the method may further include, after the new PN is set up in response to the PN setup request message, transmitting a PN setup notification message to a PNE(s) belonging to the PN.

The above aspects of the present invention are merely a part of preferred embodiments of the present invention. Therefore, those skilled in the art will understand that various embodiments reflecting the technical features of the present invention can be derived and understood based on the following detailed description of the present invention.

Advantageous Effects

Compared to a conventional technology in which a PN setup procedure for a PN GW and a PNE should be performed from the beginning to establish a PN, the PN setup procedure can be simplified using information about a frequently used PN or a specific PN (i.e. PN usage information) without the need for performing the PN setup procedure from the beginning according to the embodiments of the present invention.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 11 is a block diagram of an apparatus or a server that implements embodiments of the present invention.

BEST MODE FOR CARRYING OUT THE INVENTION

Figure 1:
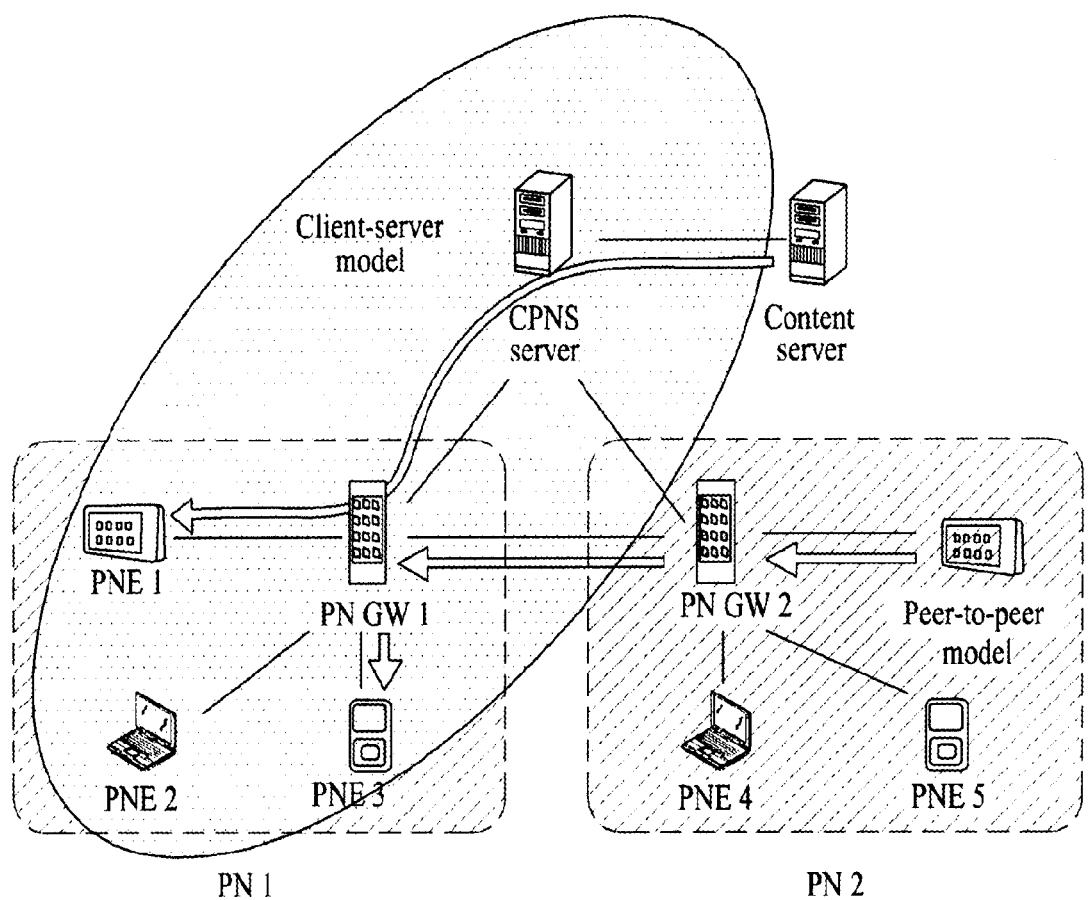
FIG. 1 illustrates the concept of a Converged Personal Network Service (CPNS)

The present invention relates to a Converged Personal Network Service (CPNS). However, the present invention is not limited thereto and is applicable to any communication system and method to which the technical features of the present invention can be applied, and other systems.

The technical terms used in the present invention are provided simply to describe specific embodiments, not intended to restrict the present invention. Unless otherwise defined, all the technical terms used herein have the same meanings as terms generally understood by those skilled in the art. The terms should be interpreted as neither excessively comprehensive meanings nor excessively narrow meanings. If technical terms used in the specification are too wrongly chosen to accurately express the subject matter of the present invention, they should be replaced with ones readily understood to those skilled in the art. In addition, general terms used herein should be understood so as to have the same meanings as defined in a general dictionary or as contextual meanings of the related art. The terms should not be interpreted as excessively narrow meanings.

Herein, singular expressions include plural expressions unless otherwise clarified in the context. In this description, the term "comprise" or "include" is not interpreted as necessarily including all of the components or steps described in the specification. Rather, it should be understood that there are possibilities of omitting or adding one or more components or steps.

While ordinal numbers like first, second, etc. can be used to describe a number of components, these components are not limited by the terms. The terms are used only to distinguish one component from other components. For example, a first component may be referred to as a second component or vice versa within the scope and spirit of the present invention.

When it is said that one component is "connected" or "linked" to another component, they may be connected or linked directly or with a third component in between. On the other hand, if it is clarified that one component is "directly connected" or "directly linked" to another component, it should be understood that a third component is not interposed between the components.

Reference will now be made to preferred embodiments of the present invention with reference to the attached drawings Like reference numerals denote the same or similar components and redundant descriptions of the components are avoided. A detailed description of known technologies will be omitted lest it should obscure the subject matter of the present invention. In addition, the attached drawings are provided to help easy understanding of the subject matter of the present invention, not limiting the present invention. The spirit of the present invention should be interpreted as expanding to all variations, equivalents, and replacements besides the attached drawings.

Various terminals or devices are shown in the drawings. The term terminal or device may be replaced with User Equipment (UE), Mobile Equipment (ME), Mobile Station (MS), User Terminal (UT), Subscriber Station (SS), wireless device, handheld device, or Access Terminal (AT). Further, the terminal or device may be a portable device equipped with communication capabilities, such as a portable phone, a Personal Digital Assistant (PDA), a smartphone, a wireless modem, a laptop computer, etc. or a non-portable device such as a Personal Computer (PC) or an in-vehicle device.

Some terms used herein will first be defined as follows.

DEFINITIONS OF TERMS

Before describing the present invention with reference to the attached drawings, terms used throughout the specification will be described in brief to help the understanding of the present invention.

1) CPNS: Devices belonging to a Personal Network (PN) (or Personal Area Network (PAN)) may receive various services by the CPNS. Compared to a tethering service in which a device connected to the Internet assigns a private Internet Protocol (IP) address to another device by Network Address Translation (NAT) so that the other device may access the Internet using the private IP address, the CPNS enables a first device of a user to manage various services available through a mobile communication network in an integrated manner, beyond simple allocation of a private IP address to another device. As the first device of the user manages various services in an integrated manner, a plurality of devices of the user may share the services seamlessly. For example, the first device of the user may transfer an ongoing Video On Demand (VOD) service to a second device without interruptions, thereby increasing user convenience. Further, if the user has a plurality of services and an external server is to transmit service data to the user without a request from the user, the external server may select one of the devices to which the service data is to be transmitted. For example, if the user has a plurality of devices capable of video calls and receives a video call request, which one of the devices to receive the video call may be determined. The ongoing video call may be transferred to another device of the user. The CPNS is implemented by a CPNS-enabled entity of a user device.

2) CPNS-enabled entity: A logical entity. There are three types of CPNS-enabled entities: PN Element (PNE), PN GateWay (PN GW), and CPNS server. The CPNS server is located within a core network and the PNE and the PN GW are located in CPNS devices.

3) CPNS device: A device that may operate simultaneously in a plurality of modes in a PN. The CPNS device has a function of processing, storing, and playing back content.

In addition, the CPNS device may have a communication interface that enables different CPNS devices to operate in different modes in the PN.

4) CPNS server: A functional entity that can provide resources to CPNS entities upon request or in a push manner. The CPNS server registers devices and user-related services, stores corresponding information, and registers a PN being a group of devices and a service group covering a PN and a Wide Area Network (WAN). The CPNS server may communicate with an external entity such as a content server. To implement a service on a CPNS framework, the CPNS server configures a key for authenticating a device as owned by a user. In addition, the CPNS server registers an externally provided service and supports a discovery request and a consumption/providing request so that a device may consume a service.

5) PN: A collection of devices available to a user to consume or produce a service. All devices of the PN may be connected to a PN GW. The PN may vary over time. The PN may include a device operating in a PN GW mode and another device operating in a PNE mode.

6) PNE: The abbreviation of Personal Network Element. A PNE is a member of a PN. The PNE may consume or provide a service or content. The PNE actually consumes content, an application, and a service. The PNE is a member that forms a PN and a service group on a CPNS framework.

7) PN GW: The abbreviation of Personal Network Gateway. A PN GW is an entity located in a PN and a WAN. The PN GW may form a PN that provides the CPNS. Further, the PN GW is responsible for connection between heterogeneous networks for a device located in a PN, which cannot access an external network, registers connected devices to a CPNS server, and manages inventories.

A PN GW of a device may connect a PNE of a PN and another device to the CPNS server. The PN GW of the device uses a global network such as a mobile network. Further, the PN GW manages services for PNEs and manages communication and other function information.

8) PN inventory: The PN inventory includes information about a PN(s). When a PN is established or changed, a PN inventory is generated or updated (e.g. by adding and deleting PN information).

The CPNS server may store PN information registered to the CPNS server in a PN inventory. Upon receipt of a successful PN setup response from the CPNS server, the PN GW may add PN information to a PN inventory. Upon receipt of a successful PN setup response and notification from the PN GW, a PNE may add the PN information to a PN inventory.

Upon receipt of a request for releasing a specific PN, the CPNS server deletes corresponding PN information from the PN inventory. Upon receipt of a successful PN release response from the CPNS server, the PN GW may delete PN information from the PN inventory. Upon receipt of a successful PN release response and notification from the PN GW, the PNE may delete PN information from the PN inventory.

Further, when a CPNS entity manages the PN, device capabilities need to be checked, or a PNE requests PN information about other CPNS users or PN information about a remote PN of a CPNS server through service discovery, a PN inventory may be used.

9) PN Info: Information about a PN. When a PN is established, PN information about the PN is stored or updated in a PN inventory. If the PN is released, the PN information is deleted from the PN inventory. Specifically, the PN information includes the attributes of PN Identifier (ID), Description, Temp PN, Active, Sharing, Disclosure, OwnershipEntityID, PN GW Info, and PNE Info. The PN ID identifies a PN and the Description describes the PN. The Temp PN is information indicating whether the PN is temporary. The Active attribute indicates an active state of the PN. If at least one PNE is physically connected to the PN, the PN is active. If all PNEs are disconnected from the PN, the PN is not active. The Sharing attribute indicates a PN inventory sharing level for a PNE side. In the case of service discovery after PN setup, the Disclosure attribute indicates an intention to disclose the PN information. The Disclosure attribute is set to one of Blocked, Open, and Selective. The OwnershipEntityID identifies an authenticated CPNS entity authorized to disclose PN information, upon request of service discovery. The PN GW Info and the PNE Info provide information about a PN GW and information about a PNE, respectively.

For details of a PN inventory and PN information, refer to [Table 9].

Figure 9:
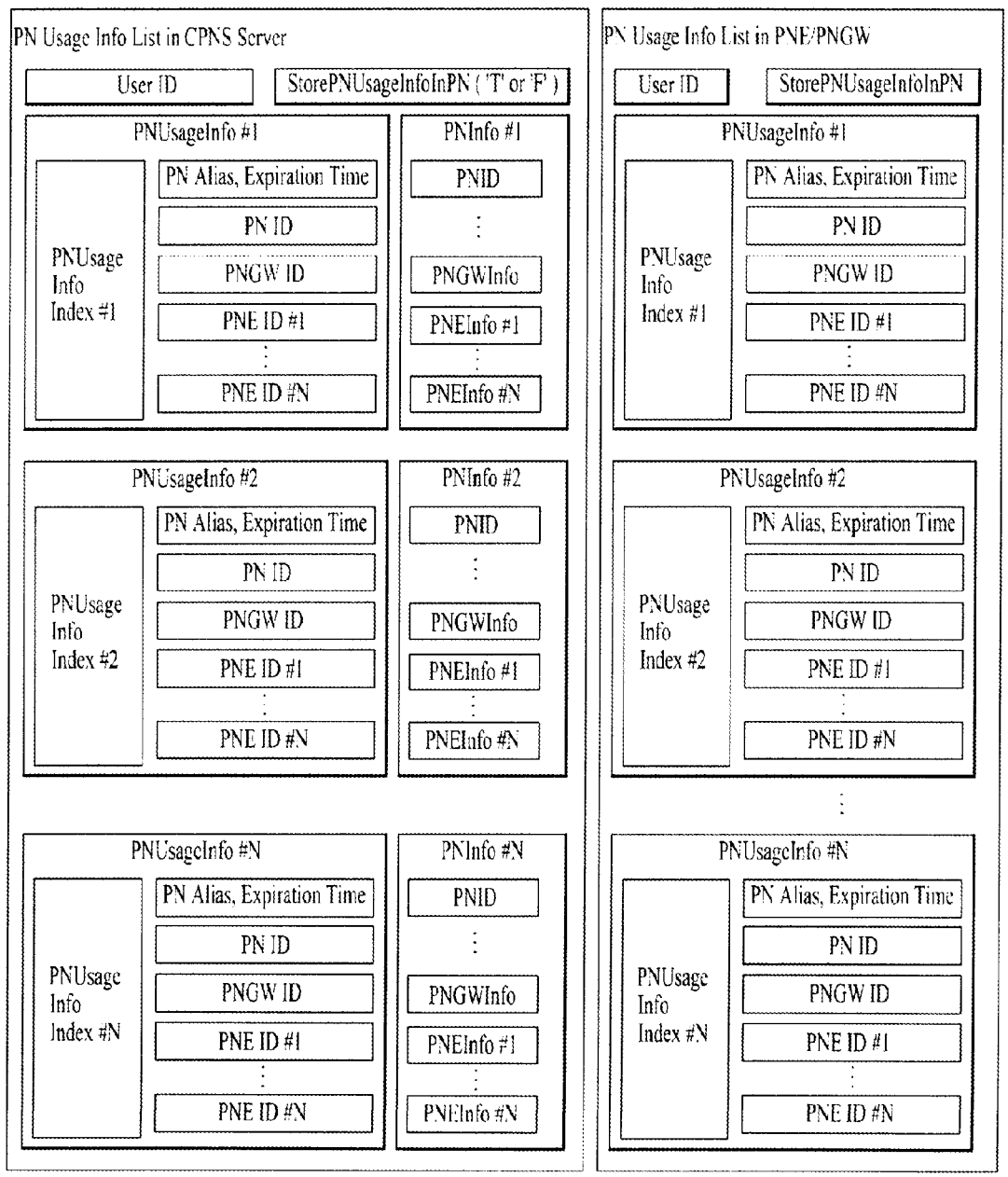
FIG. 9 illustrates a format of PN usage information according to an embodiment of the present invention.
Figure 10:
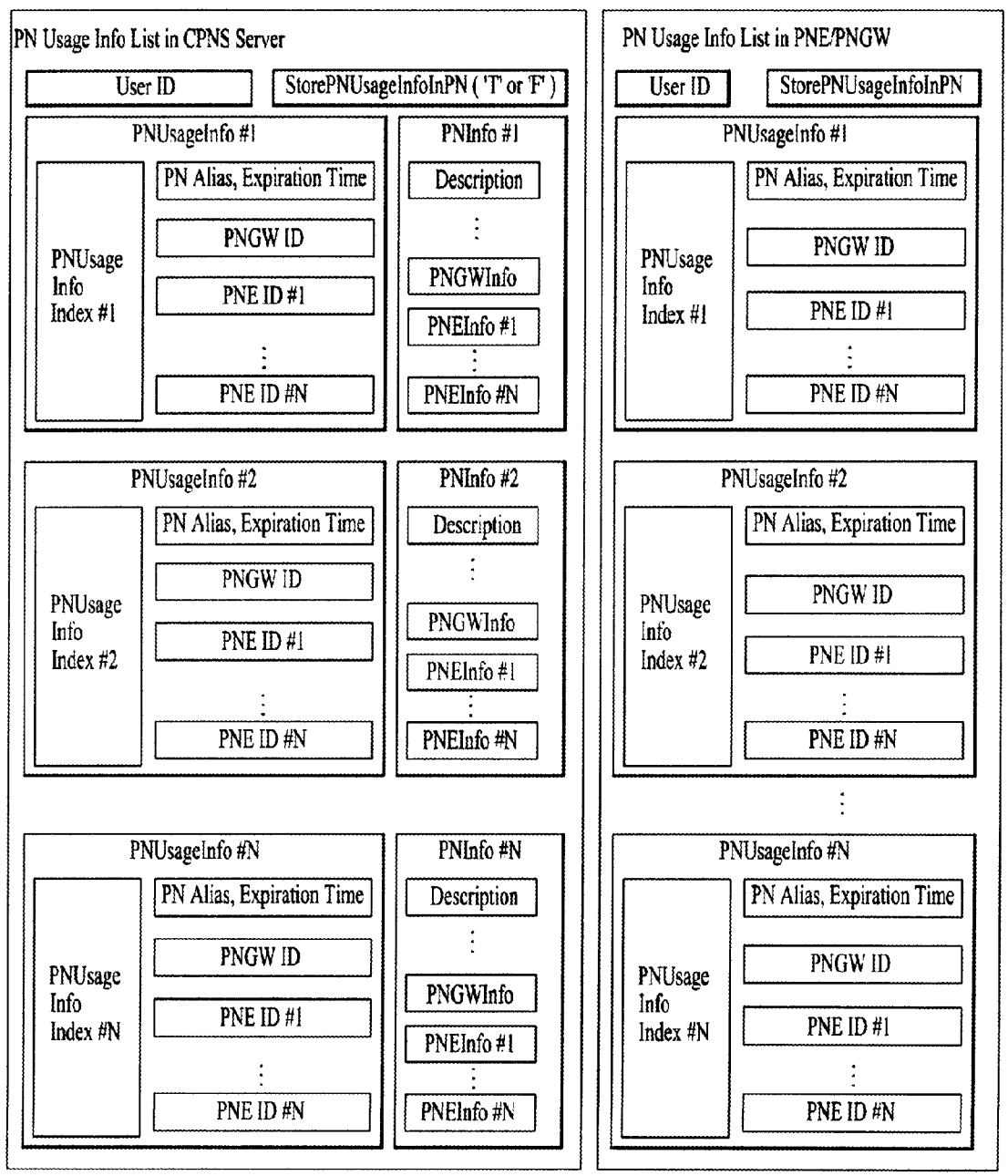
FIG. 10 illustrates a format of PN usage information according to an embodiment of the present invention.

10) PN Usage Info: Information including previous PN configuration information (about a PN GW and member PNEs) that a user used and preferences of PN usage information (PN Alias, Expiration Time, etc.). Specifically, the PN usage information includes PNUsageInfoIndex, PN Alias, Expiration Time, (PNID), PNGW ID, and PNE ID #n (as illustrated in FIGS. 9 and 10). The PNUsageInfoIndex is an index indicating PN usage information in a PN usage information list, the PN Alias is an alias that helps a user to memorize PN usage information easily, the Expiration Time specifies a time at which a valid time of PN usage information expires and the PN usage information is deleted, and entities of the PN may be determined based on the PN ID, the PNGW ID, and the PNE ID.

11) PN Usage Info List: A PN usage information list including PN usage information. The PN usage information list resides in (a PN usage information storage), a CPNS server, a PN GW, and a PNE. The PN usage information list may be created when PN usage information is initially stored and may be updated when PN usage information is added and deleted.

The CPNS server may store PN usage information and a copy of PN information (PN information without a PN ID) in the PN usage information list. The PN GW and the PNE may store a summary of the PN usage information in PN usage information lists according to a user-selected option of storing PN usage information (see FIGS. 9 and 10).

12) Service Group: A set of PNEs and PN GWs that share services, data, and applications. The service group refers to a set of devices registered to a server through a generated PN. All of the member devices of the service group do not need to belong to the same PN. The member devices of the service group may be geographically distributed in a plurality of PNs and thus may not be connected directly. Further, the member devices of the service group may not need to be owned by the same user.

13) Zone: A specific geographic area.

14) Zone-based service: a CPNS service to be provided in a zone that a PN GW covers.

15) Zone PN GW: a PN GW that provides a unique service or content in a zone.

16) Modes of CPNS-enabled entity: A CPNS device may operate in a PN GW mode and a PNE mode. The modes may be known between devices by a CPNS entity discovery function. A PN should include at least a device operating as a PN GW and a device operating as a PNE. Each of the PNE and the PN GW should know the other's mode to establish or join a PN. The PN GW should be able to identify the PNE to join the PNE as a member of the PN. The PNE should know the PN GW to establish a new PN or join an existing PN.

In the presence of a device supporting only the PNE mode (e.g., an MP3 player or a smart meter), the device operates only as a PNE. If a device can operate only as a PN GW, the device operates as a PN GW. On the other hand, if a device can operate as either of a PN GW and a PNE, the device may operate as a PN GW or a PNE according to a pre-stored setting value and its mode may be changed by a user setting or an operator setting.

Figure 2:
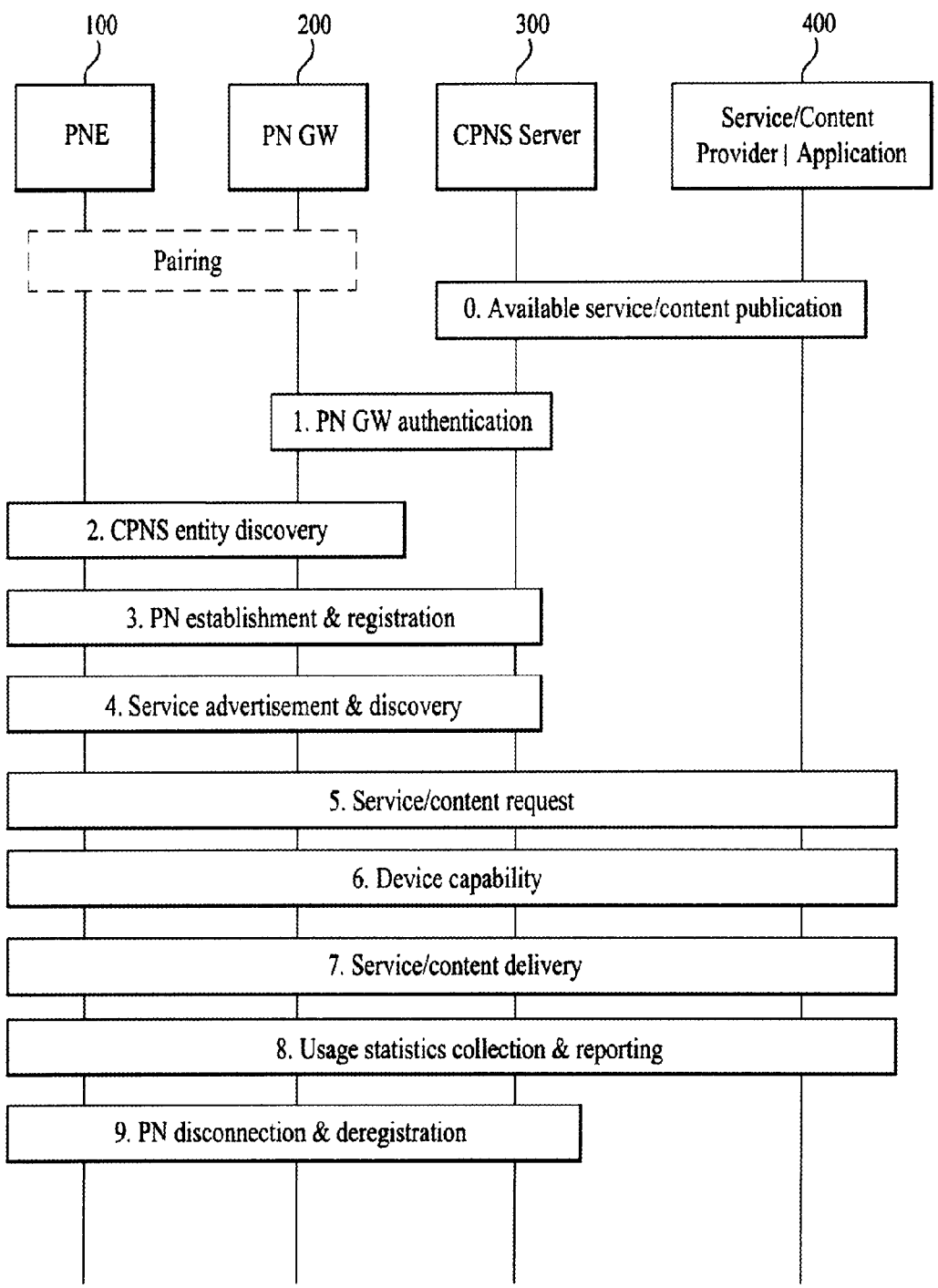
FIG. 2 is a diagram illustrating a signal flow for an overall CPNS procedure.

FIG. 2 is a diagram illustrating a signal flow for an overall CPNS procedure. As noted from FIG. 2, the CPNS may be implemented by a PNE 100, a PN GW 200, a CPNS server 300, a service/content provider or application server 400.

The PNE 100 and the PN GW 200 are devices owned by User A. For example, the PNE 100 is a portable multimedia device of User A including only a second transceiver that may form a PN and operate, for example, in Bluetooth, Wireless Fidelity (WiFi), or ZigBee, without a first transceiver communicating with a mobile communication network. The PN GW 200 is a cellular phone of User A including a first transceiver to connect to the CPNS server 300 and a mobile communication network. The PN GW 200 may further include a second transceiver that operates, for example, in Bluetooth, WiFi, or ZigBee to form a PN.

Each of the PNE 100 and the PN GW 200 may include a CPNS-enabled entity. The CPNS-enabled entity may operate in a PN GW mode or a PNE mode. In FIG. 2, since the PN GW 200 includes the first transceiver communicating with the mobile communication network, the PN GW 200 operates as a gateway, whereas the PNE 100 operates as a PNE due to the absence of the first transceiver.

Before CPNS messages are transmitted and received, a physical connection (pairing) should be established between the PNE 100 and the PN GW 200 by a PAN technology. It is assumed that the PNE 100 is a first PNE which participates in the PN. While only one PNE 100 is shown in FIG. 2, a plurality of PNEs may exist in the PN.

0. Whenever a service and content is available, the service/content provider or application server 400 publishes a service description to the CPNS server 300.

1. The PN GW 200 is authenticated by the CPNS server 300. This procedure may be performed before or after the pairing between the PN GW 200 and the PNE 100. While step 1 is performed after the pairing between the PNE 100 and the PN GW 200 in FIG. 2, this is purely exemplary.

2. The PNE 100 or the PN GW 200 initiates CPNS entity discovery. The CPNS entity discovery enables discovery of a current operational CPNS mode (the PNE mode or the PN GW mode) in a CPNS device.

3. The PNE 100 and the PN GW 200 are connected to each other through a PN. The PN GW 200 creates information about the PN for a PN inventory. The PN GW 200 may register the PN by transmitting the PN inventory to the CPNS server 300.

4. The CPNS server 300 advertises the service description to the PNE 100 or the PNE 100 queries about the service description to the CPNS server 300.

5. The PNE 100 invokes a service or requests content based on the service description provided by the CPNS server 300.

6. Information about device capabilities of the PNE 100 that consumes a service or content may be shared with the CPNS server 300 and/or the service/content provider 400, for delivery of the service and content.

7. The service/content provider 400 delivers the service or content to the PNE 100.

8. The PNE 100 reports all information about service usage from the CPNS device based on a user preference or a policy. The CPNS server 300 collects the report from the PNE(s) with related user information.

9. The PNE 100 or the PN GW 200 requests disconnection from the PN. Then, the PN GW 200 de-registers to the CPNS server 300 on behalf of the PNE 100.

Figure 3:
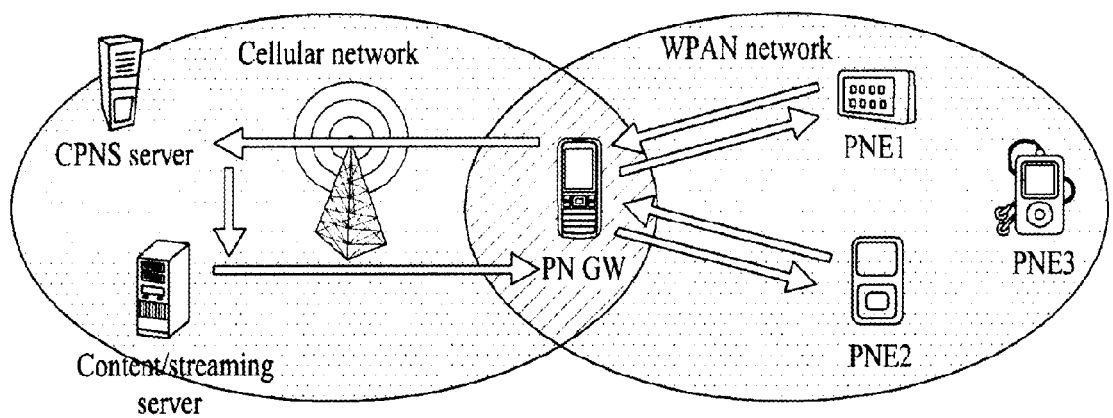
FIG. 3 illustrates a basic architecture of the CPNS.

FIG. 3 illustrates a basic architecture of the CPNS. There are a CPNS server, a content/streaming server, a PN GW in a cellular network, whereas there are the PN GW, a first PNE (PNE1), a second PNE (PNE2), and a third PNE (PNE3) in a Wireless Personal Area Network (WPAN). The PN GW is connected to both the networks. In other words, the PN GW is connected to the cellular network such as a Wideband Code Division Multiple Access (WCDMA) network and has completed network authentication. Further, the PN GW has completely established physical connections (paired) with PNE1, PNE2, and PNE3 within the PAN by WiFi, Bluetooth, ZigBee, etc. Because the cellular network is not accessible to the PNEs of the PN, the PNEs of the PN may not receive a service provided by the cellular network. Accordingly, the PNEs are kept physically connected to the PN GW to request PN setup for the CPNS and thus to receive the CPNS from the CPNS server in the WPAN through the PN GW (e.g., a mobile phone).

To receive the CPNS through a user-selected PN GW, a procedure for authenticating the PN GW in the CPNS server should precede. A user registers a user Identifier (ID) and a PassWord (PW) to the CPNS server through the authenticated PN GW. The user ID and PW mean subscription to the CPNS server and the user PW is stored as a hashed value in the CPNS server.

As described before, embodiments of the present invention propose methods for setting up a PN with a PN GW, a PNE, and a CPNS server. Specifically, the embodiments of the present invention provide 1) a method for creating PN usage information corresponding to information about an established PN and 2) a method for setting up a new PN using the PN usage information. With reference to the attached drawings, methods 1) and 2) will be described separately for the convenience of description.

Figure 4:
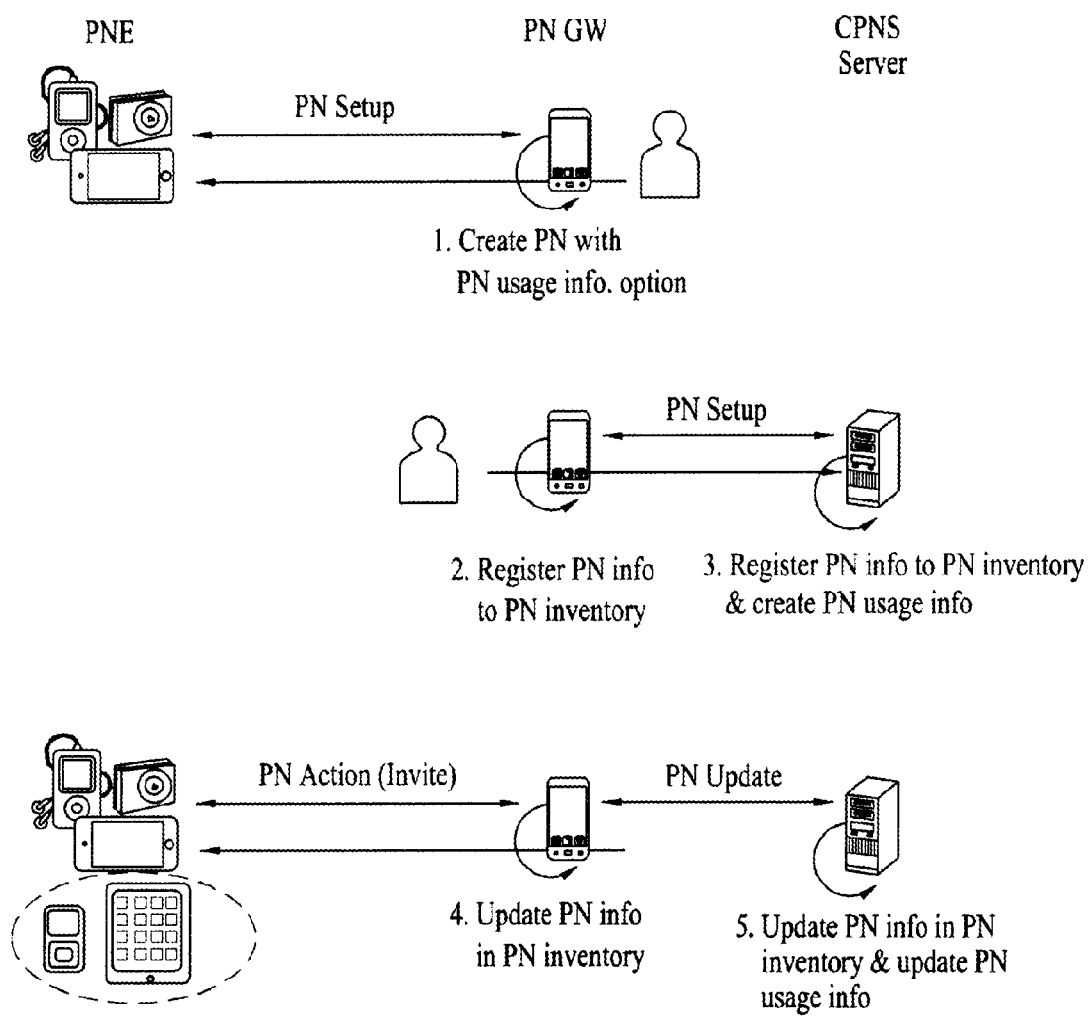
FIG. 4 conceptually illustrates a procedure for generating Personal Network (PN) usage information according to an embodiment of the present invention.

FIG. 4 conceptually illustrates a procedure for creating PN usage information according to an embodiment of the present invention.

1. A user may set up a PN. The user may set up the PN with the PNEs (three elements) and one PN GW illustrated in FIG. 4 and may agree on an option of storing and using PN usage information in the PN (i.e., the PN GW and the PNEs). While the option of storing and using of the PN usage information in the PN may be explicitly given in the form of a request of the user, a PNE, or the PN GW, they may be provided by default in the CPNS according to an embodiment of the present invention. Herein, it is assumed that the PNE or the PN GW requests creation of PN usage information to the CPNS server.

2. The PN GW may store information about the PN (i.e., PN information) including the PN GW and the three PNEs in its local PN inventory and may request a PN setup procedure to register the PN information to the CPNS server. The PN information may be first registered to the CPNS server and then stored in the local PN inventory of the PN GW. That is, storing the PN information in the local PN inventory of the PN GW may proceed or follow registration of the PN information to the CPNS server.

3. Upon receipt of the PN setup request, the CPNS server may store the PN information received from the PN GW in its PN inventory and store PN usage information in the form of a summary of the information about a PN being established currently (i.e., the PN information of the current PN) in its PN inventory or a specific storage means. After storing the PN information and the PN usage information, the CPNS server may transmit a response to the PN setup request to the PN GW.

4. The user may add two PNEs to the existing PN (i.e., a PN procedure (invitation)) and then update the PN information in the local PN inventory.

5. The PN GW may update the PN information in the PN inventory of the CPNS server by configuring new PN information based on the updated PN information. Further, the CPNS server may store PN usage information corresponding to the new PN information in its PN inventory or the specific storage means. The PN usage information may be stored in a list. After storing the PN usage information, the CPNS server may transmit a PN update result to the PN GW.

Figure 5:
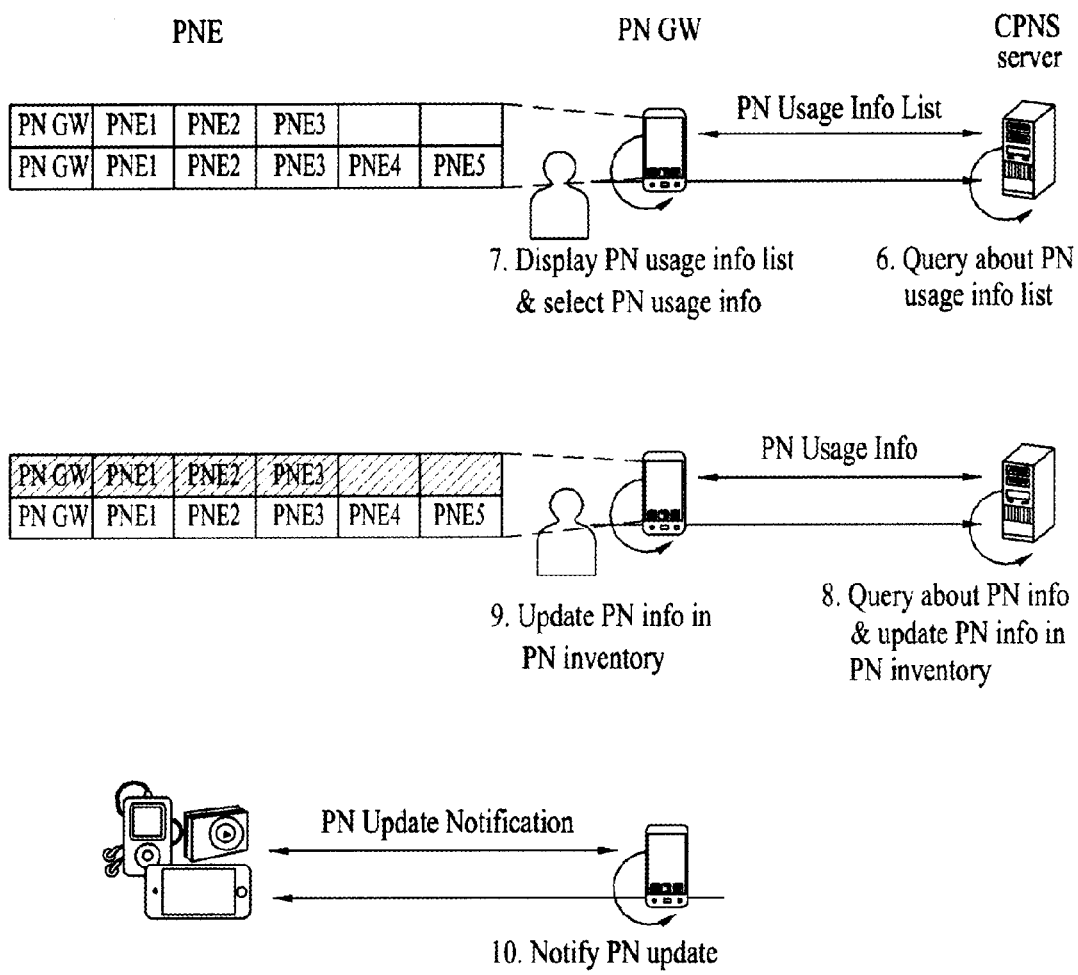
FIG. 5 conceptually illustrates a procedure for establishing a PN using PN usage information according to an embodiment of the present invention.

FIG. 5 conceptually illustrates a procedure for establishing a PN using PN usage information according to an embodiment of the present invention. The following description is given with the appreciation that the operation of FIG. 4 has already been performed. That is, it is assumed that PN usage information has been created in the CPNS server by the user (i.e., the PNE or the PN GW).

6. The PN GW may request a PN usage information list including at least one piece of PN usage information, stored in the CPNS server by transmitting a PN usage information list request message. Upon receipt of the PN usage information list request message, the CPNS server may query about the PN usage information list including at least one piece of PN usage information stored in the PN inventory or the specific storage means and may transmit the PN usage information list to the PN GW.

7. Upon receipt of the PN usage information list, the PN GW may display the at least one piece of PN usage information included in the PN usage information list to the user (or the PNE). The user or the PNE may select specific PN usage information from the at least one piece of PN usage information.

8. The PN GW requests PN information based on the selected PN usage information to the CPNS server. The CPNS server may generate new PN information based on a copy of the PN information corresponding to the selected PN usage information, update the PN information in the PN inventory with the new PN information, and transmit the updated PN information to the PN GW.

9. Upon receipt of the PN information, the PN GW may update the PN information stored in the local PN inventory by adding the received PN information.

10. The PN GW completes the PN setup procedure using the PN usage information by transmitting a PN update notification message to the PNEs of the PN so that the PNEs may update PN information in their local PN inventories.

Figure 6:
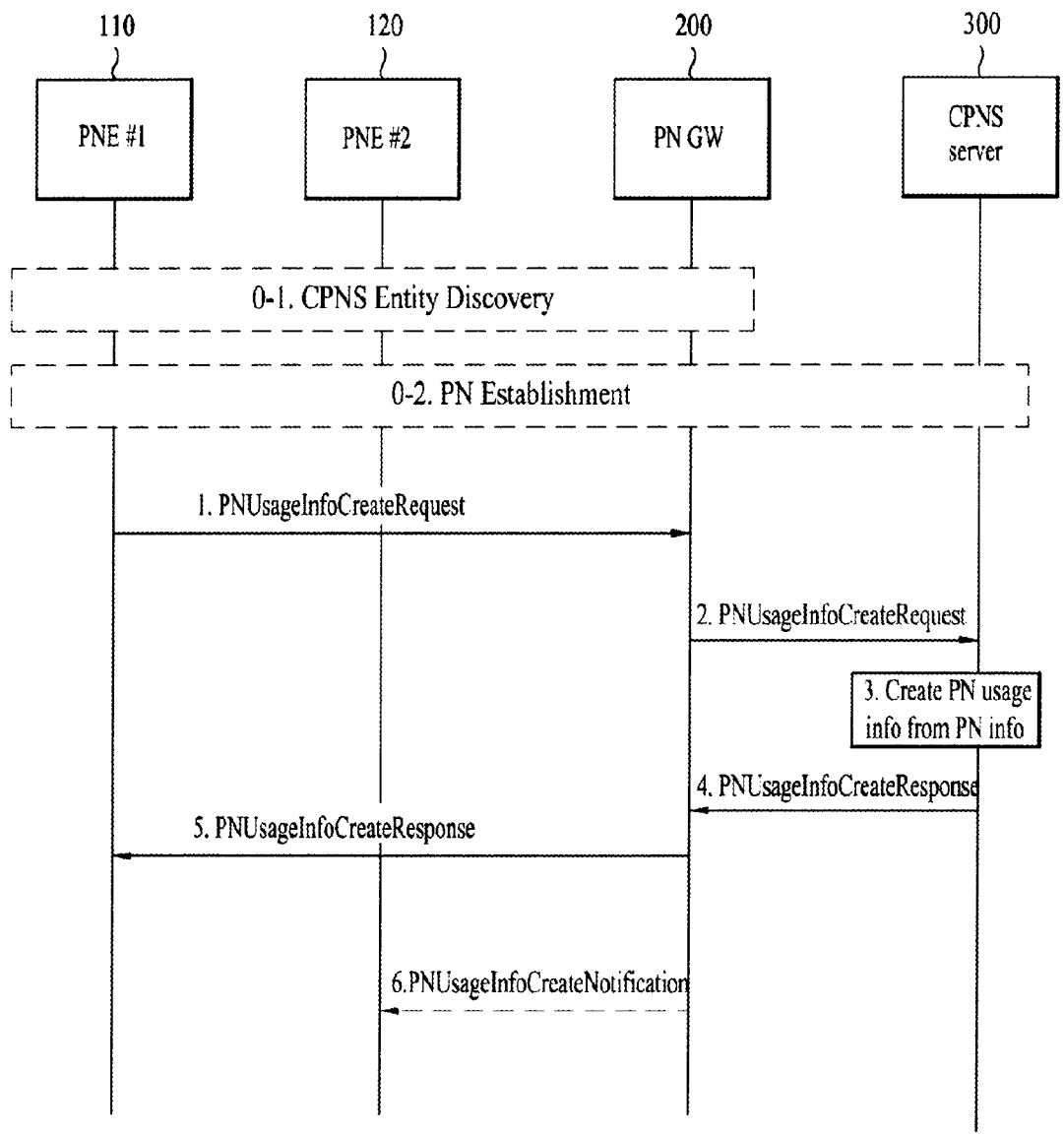
FIG. 6 is a diagram illustrating a signal flow for a procedure for creating PN usage information according to an embodiment of the present invention.

FIG. 6 is a diagram illustrating a signal flow for a procedure for creating PN usage information according to an embodiment of the present invention. A CPNS server creates PN usage information. The PN usage information may also be stored within a PN, that is, in a PNE or a PN GW according to a CPNS user's preference. A maximum size of PN usage information (or a maximum number of pieces of PN usage information) and an expiration time of the PN usage information may be set according to a CPNS policy.

The PNE or the PN GW may initiate a procedure for creating PN usage information. The procedure illustrated in FIG. 6 is initiated by the PNE. As described before, it is assumed that a first PNE (PNE #1) 110, a second PNE (PNE #2) 120, and a PN GW 200 have been physically interconnected (paired) by a PAN technology.

0. Before creating PN usage information in the CPNS server 300, PNE #1 110, PNE #2 120, and the PN GW 200 perform CPNS entity discovery among themselves respectively. It is assumed that PNE #1 110, PNE #2 120, and the PN GW 200 have already established a PN among themselves and thus PN information has already existed in PN inventories of PNE #1 110, PNE #2 120, the PN GW 200, and the CPNS server 300.

1. PNE #1 110 or a user of PNE #1 110 may initiate a procedure for creating PN usage information for the PN being currently established (hereinafter, referred to as "current PN"). To generate PN usage information in the CPNS server 300, PNE #1 110 may transmit a PNUsageInfoCreateRequest message to the PN GW 200. The PN usage information is used for one of PNEs belonging to the PN to establish a PN with a different PN configuration, that is, with a different set of PNEs or a different PN GW, after the afore-described step '0'. The PN usage information may be created so as to include a summary or all of the PN information about the current PN (described in step '0').

The PNUsageInfoCreateRequest message may include User ID, PN Alias, Expiration Time, and StorePNUsageInfoInPN indicating whether the PN usage information is to be stored in the PN. If PNE #1 110 wants to store the PN usage information in the PN, then the StorePNUsageInfoInPN attribute may be set to 'TRUE'. On the other hand, if PNE #1 110 does not want to store the PN usage information in the PN, then the StorePNUsageInfoInPN attribute may be set to 'FALSE'. The values 'TRUE' and 'FALSE' may be replaced with integer values such as 0 and 1. The Expiration Time attribute specifies a valid duration of the PN usage information to be created. If PNE #1 110 wants to delete the PN usage information about the current PN, the Expiration Time is set to '0'.

2. Upon receipt of the PNUsageInfoCreateRequest message, the PN GW 200 may forward the PNUsageInfoCreateRequest message received from PNE #1 110 to the CPNS server 300.

3. Upon receipt of the PNUsageInfoCreateRequest message, the CPNS server 300 may create new PN usage information for the current PN based on the received attributes.

For example, the CPNS server 300 may check whether there is a PN usage information list matching to the User ID included in the PNUsageInfoCreateRequest message. In the absence of a PN usage information list matching to the User ID, the CPNS server 300 may generate a new PN usage information list.

The PN usage information may include PNUsageInfo Index, PN Alias, Expiration Time, PN ID, PNGW ID, and PNE ID(s). The CPNS server 300 may store the PN usage information in a PN usage information list. Or the CPNS server 300 may copy the PN usage information and PN information corresponding to the PN usage information from the PN inventory and store the copy in the PN usage information list.

4. After storing the PN usage information, the CPNS server 300 may generate and transmit a PNUsageInfoCreateResponse message to the PN GW 200. The PNUsageInfoCreateResponse message may include Result indicating the result of generating the PN usage information.

The Result included in the PNUsageInfoCreateResponse message is an attribute indicating whether the PN usage information has been created successfully. If the PN usage information has been created successfully, the Result attribute may be set to '1' and otherwise, the Result attribute may be set to '0'.

As described before, if the StorePNUsageInfoInPN attribute was set to 'TRUE' in the PNUsageInfoCreateRequest message, this response message may include the PN usage information.

5. The PN GW 200 may forward the CreatePNUsageInfoResponse message to PNE #1 110. If the CreatePNUsageInfoResponse message includes the PN usage information, the PN GW 200 may store the PN usage information in its PN usage information list. Upon receipt of the PNUsageInfoCreateResponse message, PNE #1 110 may check the result of this procedure. If the response message includes the PN usage information, PNE #1 110 may store the PN usage information with the index of the PN usage information in its PN usage information list.

6. If the PNUsageInfoCreateResponse message includes the PN usage information, the PN GW 200 may generate a PNUsageInfoCreateNotification message and transmit the PNUsageInfoCreateNotification message to PNE #2 120. The PNUsageInfoCreateNotification message includes the PN usage information and its index. Upon receipt of the PNUsageInfoCreateNotification message, PNE #2 120 may store the index and the PN usage information in its PN usage information list. That is, the PN GW 200 transmits the PN usage information along with its index to PNEs that did not request creation of the PN usage information so that the PNEs may update their local PN inventories with the received PN usage information.

The PNUsageInfoCreateRequest message includes PN Alias. The PN Alias is a name that the CPNS user arbitrarily assigns to the PN or the PN usage information, by which the user easily memorizes the PN or the PN usage information. Accordingly, the CPNS user may manage the PN or the PN usage information according to the PN Alias attribute of the PNUsageInfoCreateRequest message. Further, the PN Alias is also an element of the PN usage information created by the CPNS server 300 as well as an element of the PNUsageInfoCreateRequest message. Therefore, the PN Alias may be information identifying the PN or the PN usage information.

In the embodiment illustrated in FIG. 6, if the PN usage information about the current PN has already been created and stored in the CPNS server 300 in step 3, the CPNS server 300 may generate PN usage information for the same PN. In general, the same attributes except for PN Alias and Expiration Time included in the PNUsageInfoCreateRequest message may be used. Therefore, if there is a different attribute, the new PN usage information to be created may be different from the already created and stored PN usage information. As a result, the PN usage information is not redundant. Even though all attributes of the PNUsageInfoCreateRequest message are identical to the attributes of the already created and stored PN usage information, the CPNS server 300 may generate new PN usage information based on the PNUsageInfoCreateRequest message and assign a new PN usage information index to the new PN usage information.

In the embodiment illustrated in FIG. 6, one of the PNEs of the PN may request creation of PN usage information to the CPNS server and thus the CPNS server may provide the PN usage information. The PN usage information may be a summary of information about the PN, that is, PN information. Preferably, the PN usage information may include identification information about the entities of the PN, that is, the PNEs and the PN GW. The PN usage information will be described in more detail with reference to FIGS. 9 and 10.

As described before, the procedure of FIG. 6 may be initiated by the PN GW. In an embodiment illustrated in FIG. 8, the PN GW initiates the procedure, except for all or a part of the operations related to FIGS. 1 and 5 in FIG. 6.

Figure 7:
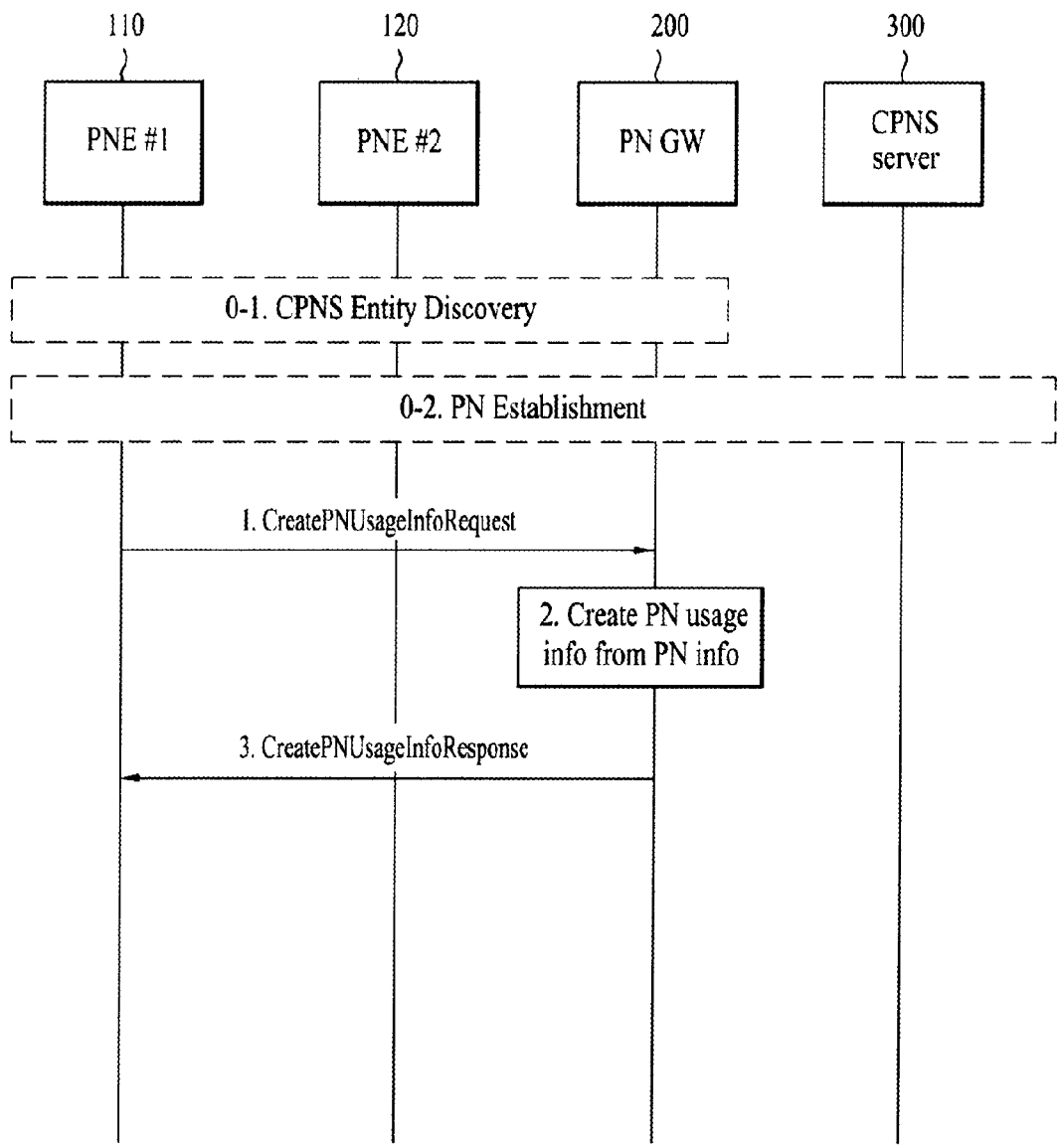
FIG. 7 is a diagram illustrating a signal flow for a procedure for creating PN usage information according to an embodiment of the present invention.

FIG. 7 is a diagram illustrating a signal flow for a procedure for creating PN usage information according to an embodiment of the present invention. Compared to the procedure illustrated in FIG. 6, the PN GW initiates creation of PN usage information. Steps 0-1 and 0-2 of FIG. 7 correspond to steps 0-1 and 0-2 of FIG. 6, respectively. The procedure of FIG. 7 is performed as follows.

1. PNE #1 110 may transmit a CreatePNUsageInfoRequest message to the PN GW 200 to store information about a PN being currently established (hereinafter, referred to as "current PN") (i.e., PN information) in the PN GW 200 and use the PN information in establishing a PN later. The CreatePNUsageInfoRequest message may include an option of using PN usage information, that is, information about creation of PN usage information or information about creation and storing of PN usage information in the PN GW 200.

2. Upon receipt of the CreatePNUsageInfoRequest message, the PN GW 200 may create PN usage information based on the information about the current PN (i.e., the PN information). The PN information may be stored in the local PN inventory of the PN GW 200 or a specific storage means. The PN usage information is all or a part of the PN information stored in the local PN inventory of the PN GW 200 or the specific storage means, which later facilitates PN setup upon request of a user or a PNE.

3. After creating the PN usage information, the PN GW 200 may transmit the result of creating the PN usage information to PNE #1 110 that requested the PN usage information.

Figure 8:
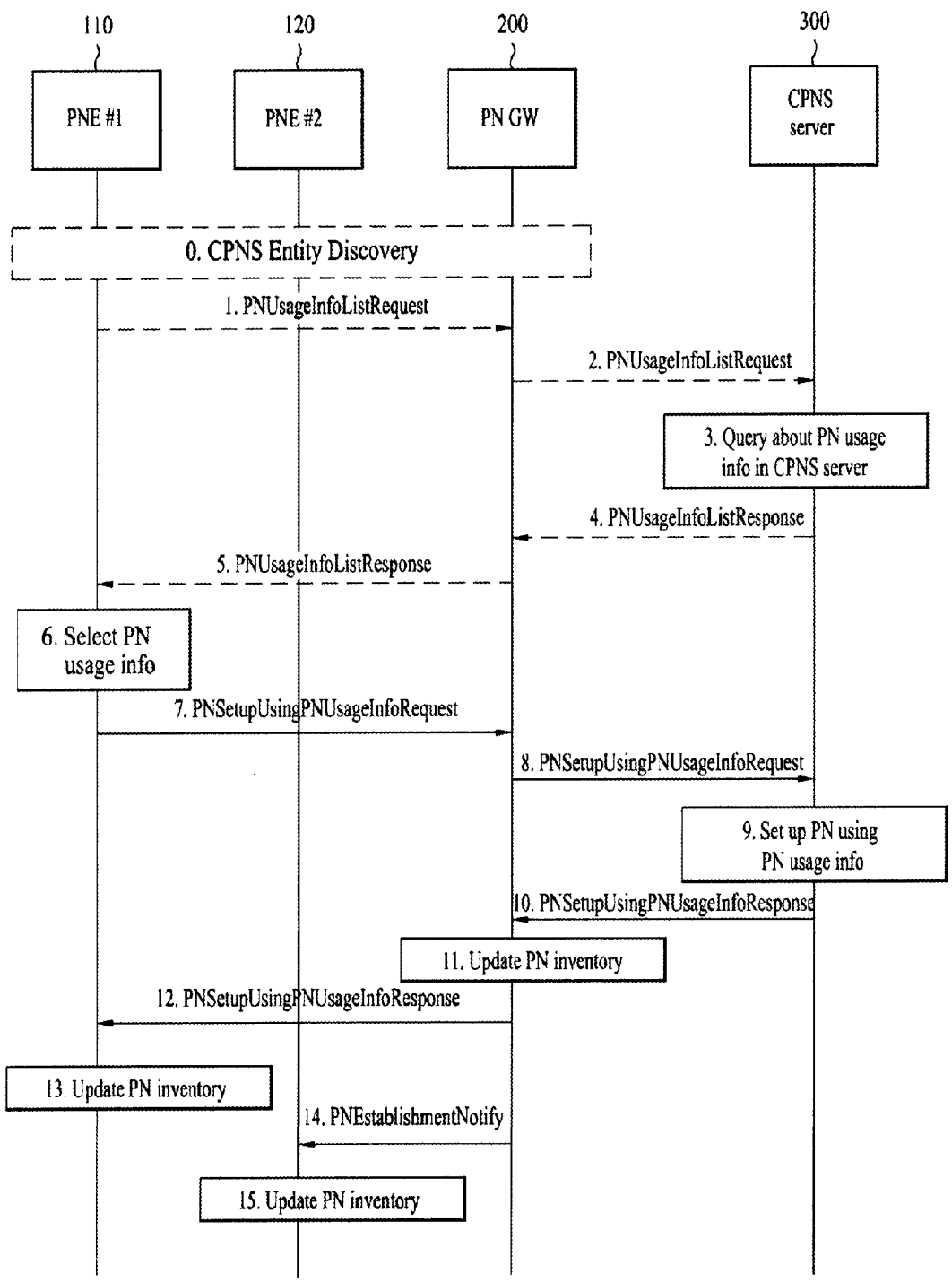
FIG. 8 is a diagram illustrating a signal flow for a procedure for establishing a PN using PN usage information according to an embodiment of the present invention.

FIG. 8 is a diagram illustrating a signal flow for a procedure for establishing a PN using PN usage information according to an embodiment of the present invention. The procedure for establishing a PN using PN usage information may be initiated by a PNE or a PN GW. The embodiment illustrated in FIG. 8 provides a PN setup procedure using PN usage information, initiated by a PNE. Herein, it may be assumed that PNE #1 110, PNE #2 120, and the PN GW 200 have been physically paired among themselves by a PAN technology and the PNEs have already acquired information about a CPNS user' preference as to whether PN usage information is to be used in PN setup by interaction with the user.

Further, PNE #1 110, PNE #2 120, and the PN GW 200 may be establishing a PN among themselves as well as they may perform physical pairing among themselves. For example, this state may occur when the CPNS user wants to switch to another PN or to create a new PN for some reason during receiving a PN service from the current PN.

If PN usage information is shared among the members of the PN and includes PN usage information that a PNE or the user wants, the PNE or the PN GW may skip steps 1 to 5. In this case, the PNE may start from step 6. Thus, steps 0 to 5 are marked with a dotted line in FIG. 8.

0. Before a PN setup procedure using PN usage information, the PNEs and the PN GW may perform CPNS entity discovery as described before.

1. PNE #1 110 may transmit a PNUsageInfoListRequest message to the PN GW 200 to retrieve PN usage information stored in the CPNS server 300.

The PNUsageInfoListRequest message may include User ID. The User ID identifies a user in relation to the PN usage information. The PNUsageInfoListRequest message may further include MaximumListLength indicating a maximum list length that the PNE may receive. The PNUsageInfoListRequest message may further include QueryOption for use as an additional search keyword to search for PN usage information in the CPNS server 300. The QueryOption attribute may include PN ID, PNGW ID, and PNE ID.

2. Upon receipt of the PNUsageInfoListRequest message, the PN GW 200 may forward the PNUsageInfoListRequest message to the CPNS server 300.

3. Upon receipt of the PNUsageInfoListRequest message, the CPNS server 300 may check the requested PN usage information in its PN usage information list. In other words, the CPNS server 300 may search for PN usage information having the same User ID as included in the PNUsageInfoListRequest message. If the QueryOption is included as an additional condition in the PNUsageInfoListRequest message, the QueryOption may be used in searching for PN usage information matching to the QueryOption (i.e., the PNGW ID included in the QueryOption is identical to a PNGW ID included in the PN usage information).

The CPNS server 300 may also check the MaximumListLength attribute included in the PNUsageInfoListRequest message. If the MaximumListLength attribute is non-zero, the CPNS server 300 may transmit a list as long as the value of the MaximumListLength. If the list is longer than the value of the MaximumListLength, the CPNS server 300 may divide the information of the PN usage information list into a plurality of chunks.

If the CPNS server 300 detects the PN usage information, the CPNS server 300 may retrieve at least one piece of PN usage information including its PN usage information index from the PN usage information list and generate a PNUsageInfoListResponse message including a PN usage information list with the PN usage information or the at least one piece of PN usage information. The PN information may be arranged.

4. The CPNS server 300 may transmit the PNUsageInfoListResponse message to the PN GW 200. The PN usage information included in the PNUsageInfoListResponse message may include PNUsageInfo Index, PN Alias, Expiration Time, PN ID, PNGW ID, and PNE ID(s).

5. The PN GW 200 may forward the PNUsageInfoListResponse message to PNE #1 110. Upon receipt of the PNUsageInfoListResponse message, PNE #1 110 may check a response to the PNUsageInfoListRequest message in a Result or Return attribute. Upon receipt of the PNUsageInfoListResponse message, PNE #1 110 may select PN usage information to request PN setup. If the PNUsageInfoListResponse message includes the PN usage information and the Return attribute is 1, PNE #1 110 may store the PN usage information in its PN usage information list.

6. PNE #1 110 may select PN usage information from the PN usage information stored in PNE #1 110 or included in the PNUsageInfoListResponse message.

7. PNE #1 110 may generate a PNSetupUsingPNUsageInfoRequest message and transmit the PNSetupUsingPNUsageInfoRequest message to the PN GW 200. The PNSetupUsingPNUsageInfoRequest message may include User ID, PNUsageInfo Index, and PNE ID(s) regarding the selected PN usage information. The PNE ID(s) identifies a PNE(s) to be included in a new PN, except for the ID of PNE #1 110.

The reason for including the PNE ID(s) in the PNSetupUsingPNUsageInfoRequest message is to enable the PN GW 200 that will receive the PNSetupUsingPNUsageInfoRequest message to check whether the PNE(s) identified by the PNE ID(s) is ready for PN setup.

8. Upon receipt of the PNSetupUsingPNUsageInfoRequest message, the PN GW 200 may check whether the PNE(s) indicated by the PNSetupUsingPNUsageInfoRequest message can participate in the PN, that is, the PNE(s) is ready for PN setup. If none of the PNEs are available, the PN GW 200 may generate a PNSetupUsingPNUsageInfoResponse message indicating failure and transmit the PNSetupUsingPNUsageInfoResponse message to PNE #1 110. On the other hand, if at least one of the PNEs is available, the PN GW 200 may update the PNSetupUsingPNUsageInfoRequest message and transmit the updated PNSetupUsingPNUsageInfoRequest message to the CPNS server 300. The updated PNSetupUsingPNUsageInfoRequest message may include the ID(s) of the available PNE(s), that is, an available PNE ID(s) regarding PN setup. That is, the PN GW 200 may transmit the updated PNSetupUsingPNUsageInfoRequest message including only the IDs of PNEs in active state from among the PNE ID(s) included in the PNSetupUsingPNUsageInfoRequest message to the CPNS server 300.

The PN GW 200 updates the PNSetupUsingPNUsageInfoRequest message in order to set up a PN with currently active PNEs. Further, when a request for a PNE of the PN is received from the outside of the PN (i.e., from another PN), the update prevents a request for an inactive PNE, thereby avoiding errors.

9. The CPNS server 300 may search for PN information corresponding to the PNSetupUsingPNUsageInfoRequest message in the PN usage information list of the CPNS server 300. That is, the CPNS server 300 may search for PN usage information having the same User ID and PNusageInfo Index as included in the PNSetupUsingPNUsageInfoRequest message. If the CPNS server 300 detects the PN usage information from the PN usage information list, the CPNS server 300 may retrieve PN information from the PN usage information and update the PN inventory by reflecting PNE information included in the PNSetupUsingPNUsageInfoRequest message (by adding the PN information). That is, the CPNS server 300 may establish the PN using the PN usage information.

Subsequently, the CPNS server 300 may generate a PNSetupUsingPNUsageInfoResponse message including the PN information about the PN.

In contrast, if the CPNS server 300 does not detect the PN information (i.e. the PN information does not exist in the CPNS server 300), the CPNS server 300 may generate a PNSetupUsingPNUsageInfoResponse message with a failure result.

10. The CPNS server 300 may transmit the PNSetupUsingPNUsageInfoResponse message to the PN GW 200. The CPNS server 300 may include a response to the PNSetupUsingPNUsageInfoRequest message as a Return or Result attribute in the PNSetupUsingPNUsageInfoResponse message. If the CPNS server 300 detects the PN usage information in the PN usage information list, the CPNS server 300 may include PN information corresponding to the PN usage information, amended according to the PNE information included in the PNSetupUsingPNUsageInfoRequest message, in the PNSetupUsingPNUsageInfoResponse message.

11. The PN GW 200 may additionally store the PN information included in the PNSetupUsingPNUsageInfoResponse message in its local PN inventory (i.e. update the local PN inventory with the PN information).

More specifically, the PN GW 200 may check whether a PN ID included in the PNSetupUsingPNUsageInfoResponse message exists in the local PN inventory. In the presence of the PN ID in the local PN inventory, the PN GW 200 may update the PN inventory with the PN information included in the PNSetupUsingPNUsageInfoResponse message. Otherwise, that is, in the absence of the PN ID in the PN inventory, the PN GW 200 may generate PN information in the PN inventory using the received PN information.

Alternatively, upon receipt of the PNSetupUsingPNUsageInfoResponse message, the PN GW 200 updates the PN inventory by adding the PN information to the PN inventory.

Further, the PN GW 200 may update the PNSetupUsingPNUsageInfoResponse message according to the value of a Sharing attribute included in the PNSetupUsingPNUsageInfoResponse message. Specifically, if the Sharing attribute is set to 1 (i.e. Share), the PN GW 200 may include PNInfo, PNGWInfo, and PNEInfo acquired from the PNSetupUsingPNUsageInfoResponse message received from the CPNS server 300 in the PNSetupUsingPNUsageInfoResponse message. If the sharing attribute is set to 2 (i.e. protect), the PN GW 200 may include only the PN information and the PN GW information acquired from the PNSetupUsingPNUsageInfoResponse message received from the CPNS server 300 in the PNSetupUsingPNUsageInfoResponse message.

12. The PN GW 200 may transmit the PNSetupUsingPNUsageInfoResponse message to PNE #1 110. Upon receipt of the PNSetupUsingPNUsageInfoResponse message, PNE #1 110 may check whether the PN ID included in the PNSetupUsingPNUsageInfoResponse message exists in the PN inventory of PNE #1 110.

13. In the presence of the PN ID in the PN inventory, PNE #1 110 may update the PN inventory with the PN usage information included in the PNSetupUsingPNUsageInfoResponse message. Otherwise, that is, in the absence of the PN ID in the PN inventory, PNE #1 110 may generate the PN information in the PN inventory using the PN information included in the PNSetupUsingPNUsageInfoResponse message.

14. Also, the PN GW 200 may generate a PNEstablishmentNotify message and transmit the PNEstablishmentNotify message to a PNE(s) of the PN other than the PNE requesting PN setup, that is, PNE #1 110. Specifically, if the Sharing attribute is set to 1 (i.e. Shared), the PN GW 200 may include the PNInfo, the PNGWInfo, and the PNEInfo acquired from the PNSetupUsingPNUsageInfoResponse message received from the CPNS server 300 in the PNEstablishmentNotify message. If the Sharing attribute is set to 2 (i.e. Protected), the PN GW 200 may include only the PNInfo and the PNGWInfo acquired from the PNSetupUsingPNUsageInfoResponse message received from the CPNS server 300 in the PNEstablishmentNotify message.

The PN GW 200 may transmit the generated PNEstablishmentNotify message to PNE #2 120. Upon receipt of the PNEstablishmentNotify message, PNE #2 120 may check whether a PN ID included in the PNEstablishmentNotify message exists in its PN inventory. Meanwhile, the PNEstablishmentNotify message may be transmitted before or simultaneously with the transmission of the PNSetupUsingPNUsageInfoResponse message.

15. In the presence of the PN ID in the PN inventory, PNE #2 120 may update the PN inventory using the PN information received in the PNEstablishmentNotify message. Otherwise, that is, in the absence of the PN ID in the PN inventory, PNE #2 120 may generate the PN information in the PN inventory using the PN information included in the PNEstablishmentNotify message.

In the embodiment of FIG. 8, the sequence of the numbered steps may be changed depending on a specific implementation example. Each message may include more elements than described before. The elements will be described in more detail later.

In the embodiment of FIG. 8, after the PN is established using the PN usage information, PNE #1 110 or PNE #2 120 may request creation of PN usage information for a PN being currently established (hereinafter, "current PN") to the PN GW 200 or the CPNS server 300. That is, the PN usage information is redundantly created, as in FIG. 6. As in the embodiment of FIG. 6, the PN GW 200 or the CPNS server 300 may process the PNSetupUsingPNUsageInfoRequest message.

The embodiment of FIG. 8 may be combined with the embodiment of FIG. 6 and the embodiment of FIG. 6 may be performed after the embodiment of FIG. 8. That is, after PNE #1 110 requests creation of PN usage information for the current PN and the PN usage information is created, PNE #1 110 may select PN usage information from PN usage information acquired from the requested PN usage information list received from the CPNS server 300 or from PN usage information stored in the local PN inventory of PNE #1 110 or in a special storage means, and request PN setup using the selected PN usage information to the CPNS server 300. Herein, the selected PN usage information may be PN usage information corresponding to the current PN.

As described before, the embodiment of FIG. 8 may be initiated by the PN GW. In this case, all or a part of steps 1, 5, 6, 7, and 12 illustrated in FIG. 8 may be omitted.

Now a description will be given of the formats of messages described in the embodiments of FIGS. 6 and 8.

Table 1 below provides a summary of the messages mentioned in the embodiments of the present invention. The PNUsageInfoCreateRequest message is mandatory, transmitted from a PNE to a PN GW and from the PN GW to a CPNS server.

If the PN GW requests creation of PN usage information, the PN GW transmits the PNUsageInfoCreateRequest message to the CPNS server. The PNUsageInfoCreateResponse message is transmitted from the CPNS server to the PN GW and from the PN GW to the PNE. The PNUsageInfoCreateNotification message is optional, transmitted from the PN GW to a PNE. The PNUsageInfoListRequest message is optional, transmitted from a PNE to the PN GW and from the PN GW to the CPNS server. The PNUsageInfoListResponse message is optional, transmitted from the CPNS server to the PN GW and from the PN GW to the PNE. The PNSetupUsingPNUsageInfoRequest message is mandatory, transmitted from a PNE to the PN GW and from the PN GW to the PNE. As described before, the PNSetupUsingPNUsageInfoRequest message is characteristically updated by the PN GW. The PNSetupUsingPNUsageInfoResponse message is mandatory, transmitted from the CPNS server to the PN GW and from the PN GW to the PNE.

TABLE 1

| Message | Implementation | Direction |
|---|---|---|
| PNUsageInfoCreateResponse | Mandatory | PNE -> PN GWPN GW -> CPNS Server |
| PNUsageInfoCreateResponse | Mandatory | CPNS Server -> PN GWPN GW -> PNE |
| PNUsageInfoCreateNotification | Optional | PN GW -> PNE |
| PNUsageInfoListRequest | Optional | PNE -> PN GWPN GW -> CPNS Server |
| PNUsageInfoListResponse | Optional | CPNS Server -> PN GWPN GW -> PNE |
| PNSetupUsingPNUsageInfoRequest | Mandatory | PNE -> PN GWPN GW -> CPNS Server |
| PNSetupUsingPNUsageInfoResponse | Mandatory | CPNS Server -> PN GWPN GW -> PNE |

Table 2 illustrates information elements of the PNUsageInfoCreateRequest message. The PNUsageInfoCreateRequest message may include User ID, PN Alias, Expiration Time, and StorePNUsageInfoInPN indicating whether PN usage information is to be stored in a PN.

TABLE 2

| Element | Cardinality | T | Data Type | Description |
|---|---|---|---|---|
| PNUsageInfoCreate Request | 1 | E | | Its sub attributes are UserID PNAlias ExpirationTime StorePNUsageInfoInPN |
| UserID | 1 | A | String | User Identification |
| PNAlias | 1 | A | String | Alias of a PN. It is used to remember a PN simply by a CPNS User |
| Expiration Time | 1 | A | Integer | ExpirationTime indicates an expiration time (in hours) of PN usage information. After the time passes, the PN Usage Info will be deleted from a CPNS Server. (e.g. If User wants to delete PN usage information after 8 hours, it shall be set to '8') |

TABLE 2-continued

| Element | Cardinality | T | Data Type | Description |
|---|---|---|---|---|
| StorePNUsageInfoInPN | 1 | A | Boolean | If CPNS User want to store PN usage information in PNEs/PN GW, this value shall be set to "TRUE". |

User ID identifies a user and PN Alias indicates an alias of the PN, as described before. Expiration Time specifies an expiration time of PN usage information in hours. The PN usage information will be deleted from the PNE, the PN GW, and the CPNS server after the expiration time. Also, a copy of PN information corresponding to the PN usage information stored in a PN usage information list of the CPNS server will be deleted at the same time. StorePNUsageInfoInPN is set to 'TRUE' if the CPNS user wants to store the PN usage information in the PNEs/PN GW.

Table 3 illustrates information elements of the PNUsageInfoCreateResponse message. The PNUsageInfoCreateResponse message includes Result and PNUsageInfo.

tion from the PN usage information list of the CPNS server. PNGWID identifies a PN GW and the PNE ID identifies a PNE. PN Alias and Expiration Time have been described before.

Table 4 illustrates information elements of the PNUsageInfoUpdateNotification message. The PNUsageInfoUpdateNotification message includes PNUsageInfo as its element.

PNUsageInfo includes PNUsageInfoIndex, PN Alias, Expiration Time, PNID, PNGW ID, and PNEID which have been described before.

TABLE 3

| Element | Cardinality | T | Data Type | Description |
|---|---|---|---|---|
| PNUsageInfoCreate Response | 1 | E | | Its sub attributes are ResultsIts sub element is PNUsageInfo |
| Result | 1 | A | Integer | The status of success or fail. 1-Success 2-Fail |
| PNUsageInfo | 0 . . . 1 | E | | Its sub attributes are PNUsageInfoIndex PNAlias ExpirationTime PNID PNGWID PNEID |
| PNUsageInfoIndex | 0 . . . 1 | A | String | Index indicates a key index for searching the PN Usage Info from the PN Usage Info List in CPNS Server. |
| PNAlias | 1 | A | String | Alias of a PN. It is used to remember a PN simply by a CPNS User |
| Expiration Time | 1 | A | Index | ExpirationTime is indicates an expiration time of PN Usage Info. After the time, the PN Usage Info will be deleted from a CPNS Server. |
| PNGWID | 1 | A | String | PNGW Identification |
| PNEID | 1 . . . n | A | String | PNE Identification |

The Result attribute indicates the status of processing the PN usage information creation request, Success or Fail. If PN usage information is successfully created, the Result attribute is set to '1' indicating Success and if creation of PN usage information is failed, the Result attribute is set to '2' indicating Fail.

PNUsageInfo includes, as its elements, PN Alias, Expiration Time, PNGWID, and PNEID. PNUsageInfoIndex indicates a key index used to search for PN usage informa-

TABLE 4

| Element | Cardinality | T | Data Type | Description |
|---|---|---|---|---|
| PNUsageInfoUpdate Notification | 1 | E | | Its sub element is PNUsageInfo |
| PNUsageInfo | 1 | E | | Its sub attributes are PNUsageInfoIndex PNAlias ExpirationTime PNID PNGWID PNEID |
| PNUsageInfoIndex | 1 | A | String | PNUsageInfoIndex indicates a key index for searching the PN Usage Info from the PN Usage Info List in CPNS Server. |
| PNAlias | 1 | A | String | Alias of a PN. It is used to remember a PN simply by a CPNS User |
| Expiration Time | 1 | A | Index | ExpirationTime is indicates an expiration time of PN Usage Info. After the time, the PN Usage Info will be deleted from a CPNS Server. |
| PNGWID | 1 | A | String | PNGW Identification |
| PNEID | 1 . . . n | A | String | PNE Identification |

Table 5 illustrates information elements of the PNUsageInfoListRequest message. The PNUsageInfoListRequest message includes User ID, MaximumListLength, and QueryOption as its elements.

TABLE 5

| Element | Cardinality | T | Data Type | Description |
|---|---|---|---|---|
| PNUsageInfoListRequest | 1 | E | | Its sub attributes are UserID MaximumListLengthIts sub elements are QueryOption |
| UserID | 1 | A | String | User Identification |
| MaximumListLength | 1 | A | Integer | Maximum PNUsageInfoList length that PNE/PN GW can receive with this operation. If this value is non-zero, the CPNS Server shall send the PNUsageInfoList shorter than or equal to this value. |
| QueryOption | 0 ... 1 | E | | Its sub attributes are: PNGWID PNEID |
| PNGWID | 0 ... 1 | A | String | PNGW Identification |
| PNEID | 0 ... n | A | String | PNE Identification |

User ID identifies the user and MaximumListLength specifies a maximum PN usage information list length that the PNE/PN GW may receive by this operation. If MaximumListLength is non-zero, the CPNS server may transmit a PN Usage information list shorter than or equal to this value. QueryOption includes PNGWID and PNEID as its elements. The meanings of the PNGWID and the PNEID have been described before.

Table 6 illustrates information elements of the PNUsageInfoListResponse message. The PNUsageInfoListResponse message includes Result and PNUsageInfo as its elements.

Result indicates the result of processing the PNUsageInfoListRequest message. If the result of processing the PNUsageInfoListRequest message is success, Result may be set to '1' and if the result of processing the PNUsageInfoListRequest message is failure, Result may be set to '2'.

PNUsageInfo includes PNUsageInfoIndex and PNUsageInfo as its elements and these elements have been described before.

Table 7 illustrates information elements of the PNSetupUsingPNUsageInfoRequest message. The PNSetupUsingPNUsageInfoRequest message includes User ID, PNUsageInfoIndex, and PNEID as its elements. These elements are mostly the same as described before, except for PNEID which will be described herein.

TABLE 6

| Element | Cardinality | T | Data Type | Description |
|---|---|---|---|---|
| PNUsageInfoListResponse | 1 | E | | Its sub attributes are ResultsIts sub elements are PNUsageInfo |
| Result | 1 | A | Integer | The status of success or fail. 1-Success 2-Fail |
| PNUsageInfo | 0 ... n | E | | Its sub element is PNUsageInfoIndex PNUsageInfo |
| PNUsageInfoIndex | 1 | A | String | PNUsageInfoIndex indicates a key index for searching the PN Usage Info from the PN Usage Into List in CPNS Server. |
| PNUsageInfo | 1 | E | | Its sub attributes are PNAlias Expiration Time PNID PNGWID PNEID |
| PNAlias | 1 | A | String | Alias of a PN. It is used to remember a PN simply by a CPNS User. |
| PNGWID | 1 | A | String | PNGW Identification |
| PNEID | 1 ... n | A | String | PNE Identification |

TABLE 7

| Element | Cardinality | T | Data Type | Description |
|---|---|---|---|---|
| PNSetup UsingPNUsageInfo Request | 1 | E | | Its sub attributes are UserID PNUsageInfoIndex PNEID |
| UserID | 1 | A | Sting | User Identification |
| PNUsageInfoIndex | 1 | A | String | Index indicates a key index for searching the PN Usage Info from the PN Usage Info List in CPNS Server. |
| PNEID | 0 ... n | A | String | PNE Identification. It is used to check whether the PNE is ready to PN Setup. PNE includes this attribute for indicating PNE(s) in selected PN usage information. PN GW includes this attribute for indicating PNE(s) for available for PN Setup. |

PNEID identifies a PNE. PNEID is used to check whether the PNE is ready for PNE setup, That is, PNEID is used to check whether a PNE(s) identified by PNEID can participate in PN setup. Accordingly, the PN GW may include this attribute to indicate the PNE(s) available for PN setup.

Table 8 illustrates information elements of the PNSetupUsingPNUsageInfoResponse message. The PNSetupUsingPNUsageInfoResponse message includes Return, PNInfo, and PNEID as its elements.

TABLE 8

| Element | Cardinality | T | Data Type | Description |
| --- | --- | --- | --- | --- |
| PNSetup Using PNUsageInfoResponse | 1 | E | | The response to PNSetupUsingInfoRequest message<br>Its sub attributes are<br>Return<br>Its sub elements are<br>PNInfo<br>PNEID |
| Return | 1 | A | Integer | The answer to PNSetupUsingPNUsageInfoRequest message<br>1-OK<br>2-Failure. CPNS Enabler can't handle the request, e.g., internal error process occurs in the device embedding PNE<br>3-Not Accepted by PN GW. PN GW does not allow the request because PNE(s) in target PN does not ready to PN Setup (e.g., PNE does not discovered by PN GW)<br>4-Not Accepted by CPNS Server: CPNS Server does not allow the request<br>NOTE: the answer may be added later according to Operator Policy. |
| PNInfo | 0 . . . 1 | E | | PN Information. This is the information to be registered and stored in CPNS Server.<br>Its sub attributes are<br>PNID<br>Description<br>TempPN<br>Sharing<br>Its sub elements are<br>PNGWInfo<br>PNEInfo |
| PNID | 1 | A | String | PN Indentification |
| Description | 0 . . . 1 | A | String | PN Description (e.g., Home, Office) |
| TempPN | 0 . . . 1 | A | Boolean | If this PN is temporary PN, this is "TRUE".<br>If the physical connection between PNGW and PNEs is broken, this PN should be released automatically. |
| Sharing | 0 . . . 1 | A | Integer | The level of PN Inventory in PNE side<br>1-Shared, PN GW Info and PNE Info are shared to PNE<br>2-Protected, PN GW Info only is shared to PNE |
| PNGWInfo | 0 . . . 1 | E | | PN GW Information.<br>Its sub attributes are<br>PNGWID<br>PNGWName<br>Mode<br>PN Admin<br>Adminee |
| PNGWID | 1 | A | String | PN GW Indentification |
| PNGWName | 0 . . . 1 | A | String | PN GW Name (e.g., nickname assigned by user or device type) |
| Mode | 0 . . . 1 | A | Integer | The mode of current device<br>2-PNGW, If the mode of device is PN GW, the value should be "PN GW".<br>3-BOTH, If the mode of device is both of PNE and PN GW, the value should be "BOTH" (e.g. mobile phone) |
| PN Admin | 0 . . . 1 | A | Boolean | If this PN GW is PN Admin, it is "TRUE" |
| Adminee | 0 . . . 1 | A | Boolean | If this PN GW is Adminee, it is "TRUE" |
| PNEInfo | 0 . . . n | E | | PNE Information.<br>Its sub attributes are<br>PNEID<br>PNEName<br>Mode<br>Description<br>PN Admin<br>Adminee<br>Its sub elements are<br>DeviceCapa<br>ServiceProfile |
| PNEID | 1 | A | String | PNE Information |
| PNEName | 0 . . . 1 | A | String | PNE Name (e.g., nickname assigned by user) |
| Mode | 1 | A | Integer | The mode of device. The member can be "1" or "3".<br>1-PNE, If the mode of respondent is PNE, the value should be "PNE".<br>3-BOTH, If the mode of respondent is both of PNE and PN GW, the value should be "BOTH" (e.g. mobile phone) |
| Description | 0 . . . 1 | A | String | PN Description (e.g., Home, Office) |
| PN Admin | 0 . . . 1 | A | Boolean | If this PNE is PN Admin, it is "TRUE" |

TABLE 8-continued

| Element | Cardinality | T | Data Type | Description |
|---|---|---|---|---|
| Adminee | 0 . . . 1 | A | Boolean | If this PNE is Adminee, it is "TRUE" |
| DeviceCapa | 0 . . . 1 | E | — | Capability information of device embedding PNE DeviceCapa fragment contains information such as DeviceType, VideoCodec, etc. For CPNS V1.0 format definition is out of scope (e.g. DPE Enabler) and implementation matter. |
| ServiceProfile | 0 . . . 1 | E | — | CPNS enabled application information to support certain service and status. NOTE: *See Section 5.10 CPNS Metadata is referred. |
| PNEID | 0 . . . n | E | String | If Sharing attribute in PN Info element is set to "2", PN GW adds PN established PNE's ID(s) among member PNEs. |

Return indicates an answer to the PNSetupUsingPNUsageInfoRequest message. Return may have integer values 1 to 4. If Return is set to '1', this implies that PN setup is successful according to the PNSetupUsingPNUsageInfoRequest message. If Return is set to '2', this implies PN setup failure, that is, a CPNS enabler can't handle the request, for example, due to occurrence of an internal error process in a device embedded with the PNE. If Return is set to '3', this implies that the request is not accepted by the PN GW. If Return is set to '4', this implies that the request is not accepted by the CPNS server.

PNInfo includes PNID, Description, TemPN, Sharing, PNGWInfo, and PNEInfo as its elements. PNID is PN identification information and Description is a PN description (e.g., home or office). TempPN is set to 'TRUE' if the PN is a temporary PN. This means that if the physical connections between the PN GW and PNEs are released, this PN should be released automatically. Sharing indicates the level of a PN inventory on a PN side. If Sharing is set to 1, this indicates "shared", meaning that PN GW information and PNE information are shared with the PNE. If Sharing is set to 2, this indicates "protected", meaning that only PN GW information is shared with the PNE.

PNGWInfo includes PNGWID, PNGWName, Mode, PN Admin, and Adminee as its elements. PNGWID is PN GW identification information and PNGWName indicates a PN GW name (e.g., a nickname assigned by a user or a device type). Mode indicates the mode of a current device. If Mode is set to '2', this indicates the PN GW mode and if Mode is set to '3', this indicates both the PNE mode and the PN GW mode (e.g. a mobile phone). PN Admin indicates whether the PN GW is a PN administrator. If the PN GW is a PN administrator, it is set to "TRUE". Adminee indicates whether the PN GW is an adminee. If the PN GW is an adminee, it is set to "TRUE".

PNEInfo includes, as its elements, PNEID, PNEName, Mode, Description, PNE Admin, Adminee, DeviceCapa, and ServiceProfile. PNEID is PNE identification information and PNEName is a PNE name (e.g., a nickname assigned by a user). Mode indicates the mode of a current device. If Mode is set to '1', this indicates the PNE mode and if Mode is set to '3', this indicates both the PNE mode and the PN GW mode (e.g. mobile phone). Description is a PN description (i.e. home or office). PN Admin indicates whether the PNE is a PN administrator. If the PNE is a PN administrator, it is set to "TRUE". Adminee indicates whether the PNE is an adminee. If the PNE is an adminee, it is set to "TRUE".

DeviceCapa is capability information about a device embedded with a PNE. DeviceCapa contains information such as DeviceType, VideoCodec, etc. ServiceProfile is CPNS-enabled application information to support a certain service and status.

If the Sharing attribute of PNInfo is set to '2', the PN GW adds the ID(s) of PN-established PNE(s) among member PNEs.

Table 9 lists information elements of PN Inventory. PN Inventory includes PNInfo as its element. Among sub-elements of PNGWInfo in PNInfo, Zonebasedservicesupport indicates whether the CPNS entity is a PN GW supporting a zone based service. Broadcastgroupkeydeliverysupport indicates whether the PN GW supports delivery of a broadcast group key. The other elements have been described in [Table 1] to [Table 8] and thus will not be described herein.

TABLE 9

| Element | Cardinality | T | Data Type | Description | S | G | P |
|---|---|---|---|---|---|---|---|
| PNInfo | 1 . . . n | E | | PN Information. Its sub attributes are PNID Description TempPN Active Sharing Disclosure OwnershipEntityID Its sub elements are PNGWInfo PNEInfo | M | M | M |
| PNID | 1 | A | String | PN Identification. | M | M | M |
| Description | 0 . . . 1 | A | String | PN Description. | O | O | O |
| TempPN | 0 . . . 1 | A | Boolean | If this PN is temporary PN, this is "TRUE". If the physical connection between PNGW and all of PNEs is | O | O | O |

TABLE 9-continued

| Element | Cardinality | T | Data Type | Description | S | G | P |
|---|---|---|---|---|---|---|---|
| | | | | broken, this PN should be released automatically. If this PN is sustained PN, this TempPN attribute is empty or "FALSE". | | | |
| Active | 1 | A | Boolean | The active status of PN. TRUE - This PN is active because at least one more member PNEs are physically connected. FALSE - This PN is not active because all of member PNEs are disconnected. | M | M | M |
| Sharing | 1 | A | Integer | The level of PN Inventory sharing in PNE side 1 - Shared, both PNGWInfo and PNEInfo in PNInfo are shared in PNE 2 - Protected, only PNGWInfo in PNInfo is shared in PNE. | M | M | M |
| Disclosure | 1 | A | Integer | The willingness of openness of PN information, in case Service Discovery is requested after PN Setup 1 - Blocked; PN information should not be unveiled. 2 - Open; PN information will be unveiled, when other CPNS Entities asks service discovery. 3 - Selective: PN can be unveiled, only when the authorized CPNS entity allows in case Service discovery request contains PNID, PNEID or UserID | M | M | M |
| OwnershipEntityID | 0...1 | A | String | The ID of authorized CPNS Entity which has authorization to allow PN Information open, in case Service Discovery is requested. | O | | |
| PNGWInfo | 1 | E | | PN GW Information Its sub attributes are PNGWID PNGWName Mode Zonebasedservicesupport Broadcastgroupkeydeliverysupport PNAdmin Adminee | M | M | M |
| PNGWID | 1 | A | String | PN GW Identification. | M | M | M |
| PNGWName | 0...1 | A | String | PN GW Name (e.g. assigned nickname) | | O | O |
| Mode | 1 | A | Integer | The mode of current device 2 - PNGW, If the mode of device is PN GW, the value should be "PN GW". 3 - BOTH, If the mode of device is both of PNE and PN GW, the value should be "BOTH" (e.g. mobile phone) | | M | M |
| Zonebasedservicesupport | 0...1 | A | Boolean | If this CPNS entity is a capable PN GW of Zone Based Service, this value should be "TRUE". | O | O | O |
| Broadcastgroupkeydeliverysupport | 0...1 | A | Boolean | TRUE: PN GW supports broadcast Group Key delivery FALSE: PN GW does not support broadcast Group Key delivery. | O | M | M |
| PNAdmin | 0...1 | A | Boolean | If this PN GW is PN Admin in the PN, this value should be "TRUE" | O | O | O |

TABLE 9-continued

| Element | Cardinality | T | Data Type | Description | S | G | P |
|---|---|---|---|---|---|---|---|
| Adminee | 0...1 | A | Boolean | If this PN GW is Adminee in the PN, this value should be "TRUE". | O | O | O |
| PNEInfo | 1...n | E | | PNE Information Its sub attributes are PNEID PNEName Active Mode PNAdmin Adminee Its sub elements are UserInfo DeviceCapa ServiceProfile | M | M | C |
| PNEID | 1 | A | String | PNE Identification. | M | M | C |
| Name | 0...1 | A | String | PNE Name (e.g. mp3 player) | O | O | O |
| Active | 1 | A | Boolean | The active status of PNE. TRUE - This PNE is active because PNE is physically connected. FALSE - This PNE is not active because PNE is physically disconnected. | M | M | C |
| Mode | 1 | A | Integer | The mode of current device 1 - PNE, If the mode of device is PNE, the value should be "PNE". 3 - BOTH, If the mode of device is both of PNE and PN GW, the value should be "BOTH" (e.g. mobile phone) | | M | C |
| PNAdmin | 0...1 | A | Boolean | If this PNE is PN Admin in the PN, this value should be "TRUE" | O | O | O |
| Adminee | 0...1 | A | Boolean | If this PNE is Adminee in the PN, this value should be "TRUE". | O | O | O |
| UserInfo | 0...1 | E | — | Its attributes are UserID UserName | O | O | O |
| UserID | 1 | A | String | CPNS UserID | O | O | O |
| UserName | 0...1 | A | String | CPNS User Name | O | O | O |
| DeviceCapa | 0...1 | E | | Capability information of device embedding PNE Its sub attributes are UICapa Its sub element is ExternalCapa | O | O | O |
| UICapa | 0...1 | A | Boolean | If this device doesn't support UI functionalities, this value SHALL be set with "TRUE". TRUE: PN GW needs to support confirmation and/or Key assignment functionalities instead of PNE. | O | O | O |
| ExternalCapa | 0...1 | E | — | XML fragment contains information such as DeviceType, VideoCodec, etc. CPNS V1.0 can make use of the format of device capabilities from DPE Enabler specification. | O | O | O |
| ServiceProfile | 0...1 | E | | CPNS enabled application information to support certain service and status. Its sub elements are Service ContentInfo | O | O | O |

FIG. 9 illustrates a format of PN usage information according to an embodiment of the present invention. PN usage information stored in a CPNS server is slightly different from PN usage information stored in a PNE/PN GW.

Referring to PN usage information (or its list) stored in the CPNS server on the left side of FIG. 9, the PN usage information may include User ID, StorePNUsageInfoInPN indicating whether the PN usage information is to be stored in a PN, N PNUsageInfos, and corresponding N PNInfos. Each PNUsageInfo may include PNUsageInfo Index, PN Alias, Expiration Time, PN ID, PNGW ID, and N PNE ID(s), and each PNInfo may include PN ID, PNGWInfo, and N PNEInfos.

The PN usage information list of the CPNS server basically includes an option of using the PN usage information list regarding User ID and StorePNUsageInfoInPN for a CPNS user.

Upon receipt of a PNUsageInfoCreateRequest message from a PNE or the PN GW, the CPNS server extracts PN usage information from current PN information and the PNUsageInfoCreateRequest message and adds the PN usage information to the PN usage information list. Herein, a new PN usage information index is generated for the new PN usage information. The PN usage information index may be increased sequentially or may be generated randomly. However, the PN usage information index should be unique in the PN usage information list.

Referring to PN usage information (or its list) stored in the PNE/PN GW on the right side of FIG. 9, the PN usage information may include User ID, StorePNUsageInfoInPN indicating whether the PN usage information is to be stored in a PN, and N PNUsageInfos. Each PNUsageInfo may include PNUsageInfo Index, PN Alias, Expiration Time, PN ID, PN GW ID, and N PNE ID(s).

FIG. 10 illustrates a format of PN usage information according to an embodiment of the present invention. Compared to the format illustrated in FIG. 9, the format illustrated in FIG. 10 does not include PN ID in PN usage information. If the format of PN usage information illustrated in FIG. 10 is adopted, upon receipt of a PNUsageInfoCreateRequest message, the CPNS server does not include PN ID in PNUsageInfo. Upon receipt of a PNSetupUsingPNUsageInfoRequest message from a PNE, the CPNS server may generate a new PN ID and assign the new PN ID to a newly established PN during updating a PN inventory with selected PN usage information.

Accordingly, when PN usage information is stored in a PN usage information list in the manner illustrated in FIG. 10, the CPNS server generates a new PN ID, adds the new PN ID to PN information stored in the PN usage information, and shares the PN usage information between the PNE and the PN GW.

FIG. 11 is a block diagram of an apparatus or a server that implements embodiments of the present invention. That is, the afore-described CPNS server, PNE, and PN GW are shown. For example, reference numerals 10, 20, and 30 denote the PNE, the PN GW, and the CPNS server, respectively. While only three entities are shown in FIG. 11, more PNEs and more PN GWs may exist. The PNE 10 may include a transceiver 11, a processor 12, and a memory 13, the PN GW 20 may include a transceiver 21, a processor 22, and a memory 23, and the CPNS server 30 may include a transceiver 31, a processor 32, and a memory 33. The transceivers communicate with another entity, the processors process a message or an instruction received through the transceivers, and the memories store the received message or a processing result. The transceivers, the processors, and the memories are configured to implement embodiments related to FIGS. 4 to 8 and will not be described in detail herein.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention are applicable to various devices or servers that form a network.

The invention claimed is:

1. A method for requesting, by a Personal Network Element (PNE) being a member of a Personal Network (PN), setup of a new PN based on PN usage information to a Converged Personal Network Service (CPNS) server, the method comprising:

transmitting, to a PN Gateway (PN GW), a request message for creating PN usage information on a PN being established currently (hereinafter, referred to as "current PN"); and receiving, from the PN GW, a response message including creation result of the PN usage information in response to the request message, wherein the PN usage information is created by the CPNS server, based on the request message and stored in a PN usage information list of the CPNS server, and the PN usage information includes a PN usage information index, a PN alias, an expiration time, a PN Identifier (ID), a PN GW ID, and a PNE ID, the method further comprising:

transmitting, to the PN GW, a PN setup request message using selected PN usage information for the new PN other than the current PN to set up the new PN; and receiving, from the PN GW, a PN setup response message including a response to the PN setup request message, wherein a PN inventory of the CPNS server is updated by the CPNS server, based on the selected PN usage information.

2. The method according to claim 1, wherein the request message includes a user ID, a PN alias, an expiration time, and an indicator indicating whether to store the PN usage information in the PN.

3. The method according to claim 2, wherein if the PNE wants to delete PN usage information for the current PN, the expiration time of the request message is set to 0.

4. The method according to claim 2, wherein if the indicator indicates that the PN usage information is to be stored in the PNE and the PN GW, the response message includes the created PN usage information.

5. The method according to claim 2, wherein if the indicator indicates that the PN usage information is to be stored in the PNE and the PN GW, the created PN usage information included in the response message is stored in a PN usage information list of the PNE.

6. The method according to claim 1, wherein the PN setup request message includes a PNE ID of at least one PNE that will belong to the new PN, except for the ID of the PNE, and
wherein the PNE ID is updated by the PN GW to PNE IDs of PNEs available for PN setup among PNEs identified by the PNE ID.

7. The method according to claim 1, further comprising:
if there is no PN usage information list including PN usage information for the new PN in the PNE, transmitting, to the PN GW, a list request message for requesting a PN usage information list including the PN usage information for the new PN; and
receiving, from the PN GW, a list response message including the PN usage information list including the PN usage information for the new PN, wherein the list response message is transmitted by the CPNS server.

8. The method according to claim 7, wherein the list request message includes a user ID, maximum list length information indicating a maximum list length that the PNE can receive, and query option information related to the request.

9. The method according to claim 1, wherein the PN setup request message includes a user ID, a PN usage information index, and a PNE ID.

10. The method according to claim 1, further comprising, if the new PN is set up in response to the PN setup request, receiving a PN setup notification message from the PN GW.

11. A method for processing, by a Converged Personal Network Service (CPNS) server, a request for setup of a new Personal Network (PN) based on PN usage information received from a PN Element (PNE) being a member of a PN, the method comprising:
receiving, from a PN Gateway (PN GW), a request message for creating a PN usage information on a PN being established currently (hereinafter, referred to as "current PN"), wherein the request message is generated by the PNE; and
generating and transmitting, to the PN GW, a response message including creation result of the PN usage information in response to the request message,
wherein the PN usage information is created by the CPNS server, based on the request message and stored in a PN usage information list of the CPNS server, and the PN usage information includes a PN usage information index, a PN alias, an expiration time, a PN Identifier (ID), a PN GW ID, and a PNE ID,
the method further comprising:
receiving, from the PN GW, a PN setup request message using selected PN usage information for the new PN other than the current PN to set up the new PN;
updating a PN inventory based on the selected PN usage information; and
transmitting, to the PN GW, a PN setup response message including a response to the PN setup request message.

12. The method according to claim 11, wherein the request message includes a user ID, a PN alias, an expiration time, and an indicator indicating whether to store the PN usage information in the PN.

13. The method according to claim 11, wherein if the indicator indicates that the PN usage information is to be stored in the PNE and the PN GW, the response message includes the created PN usage information.

14. The method according to claim 11, further comprising, upon receipt of the request message, checking whether a PN usage information list matching to a user ID included in the request message exists in the PN usage information list.

15. The method according to claim 14, further comprising:
if no PN usage information list exists, creating a PN usage information list and PN usage information; and
if the PN usage information list exists, copying information about the current PN from the PN inventory to the PN usage information list.

16. The method according to claim 11, wherein the PN setup request message includes a PNE ID of a PNE that will belong to the new PN, except for the ID of the PNE, and
wherein the PNE ID is updated by the PN GW to PNE IDs of PNEs available for PN setup among PNEs identified by the PNE ID.

17. The method according to claim 11, further comprising, upon receipt of the PN setup request message, retrieving PN information based on PN usage information included in the PN setup request message from the PN usage information list.

18. The method according to claim 11, further comprising:
if there is no PN usage information list including the PN usage information for the new PN in the PNE, receiving, from the PN GW, a list request message for requesting a PN usage information list including the PN usage information for the new PN;
searching for PN usage information matching to a user ID included in the list request message; and
transmitting, to the PN GW, a list response message including the PN usage information list including the PN usage information for the new PN.

19. The method according to claim 18, wherein the list request message includes a user ID, maximum list length information indicating a maximum list length that the PNE can receive, and query option information related to the request.

20. A method for requesting, by a Personal Network Gateway (PN GW) being a member of a Personal Network (PN), setup of a new PN based on PN usage information to a Converged Personal Network Service (CPNS) server, the method comprising:
transmitting, to the CPNS server, a request message for creating PN usage information for a PN being established currently (hereinafter, referred to as "current PN"); and
receiving, from the CPNS server, a response message including creation result of the PN usage information in response to the request message,
wherein the PN usage information is created by the CPNS server, based on the request message and stored in a PN usage information list of the CPNS server, and the PN usage information includes a PN usage information index, a PN alias, an expiration time, a PN Identifier (ID), a PN GW ID, and a PNE (PN Entity) ID, the method further comprising:

transmitting, to the CPNS server, a PN setup request message using selected PN usage information for the new PN other than the current PN to set up the new PN;

receiving, from the CPNS server, a PN setup response message including a response to the PN setup request message; and storing PN information included in the PN setup response message in a PN inventory, wherein the PN inventory of the CPNS server is updated by the CPNS server, based on the selected PN usage information.

21. The method according to claim 20, wherein the request message includes a user ID, a PN alias, an expiration time, and an indicator indicating whether to store the PN usage information in the PN.

22. The method according to claim 21, wherein if the PN GW wants to delete PN usage information for the current PN, the expiration time of the PN setup request message is set to 0.

23. The method according to claim 21, wherein if the indicator indicates that the PN usage information is to be stored in a PNE and the PN GW, the response message includes the created PN usage information.

24. The method according to claim 21, wherein if the indicator indicates that the PN usage information is to be stored in a PNE and the PN GW, the created PN usage information included in the response message is stored in a PN usage information list of the PN GW.

25. The method according to claim 20, further comprising:

if the PN GW has no PN usage information list including the PN usage information for the new PN, transmitting, to the CPNS server, a list request message for requesting a PN usage information list including the PN usage information for the new PN; and receiving, from the CPNS server, a list response message including the PN usage information list including the PN usage information for the new PN.

26. The method according to claim 25, wherein the list request message includes a user ID, maximum list length information indicating a maximum list length that a PNE can receive, and option information related to the request.

27. The method according to claim 20, wherein the PN setup request message includes a user ID, a PN usage information index, and a PNE ID.

28. The method according to claim 20, further comprising, after the new PN is set up in response to the PN setup request message, transmitting a PN setup notification message to a PNE(s) belonging to the current PN.

* * * * *